(12) United States Patent
Zhu et al.

(10) Patent No.: US 12,400,402 B2
(45) Date of Patent: Aug. 26, 2025

(54) PERSONALIZED DIGITAL VISUAL REPRESENTATION SYSTEM AND METHOD

(71) Applicant: Urus Entertainment, Inc., Studio City, CA (US)

(72) Inventors: Yuanchen Zhu, Burbank, CA (US); Fangyang Shen, Mineola, NY (US); Eitan Eduardo Grinspun, Toronto (CA)

(73) Assignee: URUS ENTERTAINMENT, INC., Studio City (CA)

( * ) Notice: Subject to any disclaimer, the term of this patent is extended or adjusted under 35 U.S.C. 154(b) by 0 days.

(21) Appl. No.: 19/038,210

(22) Filed: Jan. 27, 2025

(65) Prior Publication Data
US 2025/0245926 A1    Jul. 31, 2025

Related U.S. Application Data

(60) Provisional application No. 63/625,719, filed on Jan. 26, 2024.

(51) Int. Cl.
*G06T 17/20* (2006.01)
*G06V 40/16* (2022.01)

(52) U.S. Cl.
CPC ............ *G06T 17/20* (2013.01); *G06V 40/168* (2022.01); *G06V 40/174* (2022.01)

(58) Field of Classification Search
None
See application file for complete search history.

(56) References Cited

U.S. PATENT DOCUMENTS

| | | | | |
|---|---|---|---|---|
| 8,553,037 | B2 * | 10/2013 | Smith | G06T 13/40 345/473 |
| 11,625,878 | B2 * | 4/2023 | Chong | G06V 40/161 345/419 |
| 2009/0135176 | A1 | 5/2009 | Snoddy et al. | |
| 2011/0141105 | A1 * | 6/2011 | Ting | G06T 13/40 345/419 |

(Continued)

OTHER PUBLICATIONS

Tena, J. R. Hamouz, M. Hilton, A. Illingworth, J. "A Validated Method for Dense Non-Rigid 3D Face Registration", Video and Signal Based Surveillance, 2006. AVSS '06. IEEE International Conference on Video and Signal Based Surveillance.*

(Continued)

*Primary Examiner* — Sultana M Zalalee
(74) *Attorney, Agent, or Firm* — K&L Gate LLP; Shu Chen

(57) ABSTRACT

Disclosed herein is a computing system and method configured for generating one or more personalized digital visual representations. An example computing system may be configured to receive, from a computing device, one or more photos or videos of the user, process the one or more photos or videos to determine at least facial geometry characteristics of a user face model, obtain at least facial geometry characteristics of a plurality of canon characters from a character face model, generate a fused face model to retain the facial geometry characteristics of the user face model and the character face model, generate one or more personalized digital visual representations based at least upon the fused face model, and transmit, to the computing device, the one or more personalized digital visual representations.

28 Claims, 11 Drawing Sheets

(56) References Cited

U.S. PATENT DOCUMENTS

| | | | |
|---|---|---|---|
| 2011/0175900 A1* | 7/2011 | Beeler | G06T 17/00 |
| | | | 382/293 |
| 2013/0307848 A1* | 11/2013 | Tena | G06T 17/205 |
| | | | 345/420 |
| 2014/0043329 A1* | 2/2014 | Wang | G06T 17/20 |
| | | | 345/420 |
| 2016/0140383 A1* | 5/2016 | Kim | G06V 10/56 |
| | | | 382/118 |
| 2016/0163084 A1 | 6/2016 | Corazza et al. | |
| 2016/0261850 A1* | 9/2016 | Debevec | G06V 40/16 |
| 2017/0069124 A1* | 3/2017 | Tong | G06T 17/20 |
| 2018/0157901 A1* | 6/2018 | Arbatman | H04L 51/10 |
| 2018/0158240 A1* | 6/2018 | Saito | G06V 40/164 |
| 2019/0102603 A1* | 4/2019 | Du | G06V 10/764 |
| 2019/0266796 A1 | 8/2019 | Comer | |
| 2021/0005003 A1* | 1/2021 | Chong | G06T 17/205 |
| 2022/0237869 A1* | 7/2022 | Takeda | G06N 3/08 |
| 2023/0090253 A1* | 3/2023 | Meadows | H04L 67/12 |
| | | | 345/419 |
| 2023/0177755 A1* | 6/2023 | Starke | G06N 3/08 |
| | | | 345/473 |
| 2024/0087213 A1* | 3/2024 | Swanson | A63F 13/5255 |
| 2024/0221316 A1* | 7/2024 | Gorodissky | G06V 40/174 |

OTHER PUBLICATIONS

Sorkine, Olga & Alexa, Marc. As-Rigid-As-Possible Surface Modeling. Eurographics Symposium on Geometry Processing. 109-116. (2007).

International Search Report and Written Opinion for International Application No. PCT/US2025/013210 dated Apr. 4, 2025.

Blanz, Volker, and Thomas Vetter. "A morphable model for the synthesis of 3D faces." Proceedings of the 26th annual conference on Computer graphics and interactive techniques. 1999. 187-194.

* cited by examiner

PERSONALIZED DIGITAL VISUAL REPRESENTATION SYSTEM AND METHOD

CROSS REFERENCE TO RELATED APPLICATION

The application claims priority to U.S. Provisional Patent Application No. 63/625,719, filed on Jan. 26, 2024, entitled "SYSTEM AND METHOD FOR CREATING STYLIZED DIGITAL AVATARS," the content of which is incorporated by reference herein in its entirety.

FIELD OF TECHNOLOGY

The present disclosure generally relates to digital image processing, interactive media, and software applications, and more particularly relates to facial reconstruction and manipulation, geometric processing, and rendering for personalized digital visual representation creation from user-generated photographic or video self-portraits.

BACKGROUND

A digital visual representation of a person or character can be used in a variety of online and offline contexts. Current digital visual representation creation tools often lack the ability to automatically integrate the user's visual appearance with that of an artist-designed canon character, while also allowing fine-grained control over the degree and specific areas where the visual representation resembles either the user or the canon character. The term "canon character" may generally refer to any fictional character, including but not limited to characters native to a particular book, television show, movie, comic book, video game, and other story-driven universes, and characters synonymous with specific brands, products, and groups, such as brand mascots, promotional characters, and corporate icons.

Accordingly, there is a need for an advanced computing system and method for creating personalized digital visual representations that automatically combine the user's visual appearance with that of an artist-designed canon character, while providing fine-grained control over the degree and specific areas where the visual representation resembles either the user or the canon character.

SUMMARY

Among other features, in one embodiment, the present disclosure relates to a system deployed within a communication network for generating one or more personalized digital visual representations. The system may comprise a first computing device, comprising: a first non-transitory computer-readable storage medium configured to store an application program; and a first processor coupled to the first non-transitory computer-readable storage medium and configured to execute instructions of the application program to obtain one or more photos or videos of a user. The system may also comprise a second computing device, comprising: a second non-transitory computer-readable storage medium; and a second processor coupled to the second non-transitory computer-readable storage medium and configured to: receive, via a first application programming interface (API) call, the one or more photos or videos of the user, process the one or more photos or videos to determine at least facial geometry characteristics of a user face model, obtain at least facial geometry characteristics of a plurality of canon characters from a character face model, generate a fused face model to retain the facial geometry characteristics of the user face model and the character face model, generate one or more personalized digital visual representations based at least upon the fused face model, save parameters relating to the fused face model on the second non-transitory computer-readable storage medium, and transmit, via a second API call to the first computing device, the one or more personalized digital visual representations. The first processor of the first computing device may be further configured to execute the instructions of the application program to receive and display the one or more personalized digital visual representations on a display interface of the first computing device.

In an embodiment, the facial geometry characteristics of the user face model may comprise a plurality of three-dimensional (3D) meshes including at least data defining a connectivity between vertices, edges and faces in each of the plurality of 3D meshes.

In another embodiment, the facial geometry characteristics of the user face model may comprise parameters relating to a plurality of facial expressions.

In another embodiment, the second processor may be further configured to process the one or more photos or videos to determine parameters relating to facial textures.

In some embodiments, each of the fused face model, the user face model, and the character face model may include a plurality of 3D meshes, and the second processor is further configured to allow an adjustment of a degree of geometric similarity of a selected region of the fused face model to a corresponding region of the user face model or the character face model.

In yet another embodiment, the second processor may be further configured to determine the geometric similarity based at least on local geometric descriptors including a facial deformation descriptor, and use a blending weight map to control the geometric similarity of the selected region of the fused face model to the corresponding region of the user face model or the character face model. The facial deformation descriptor may measure local stretching and bending of each patch on a surface of each 3D mesh.

In an additional embodiment, the second processor may be further configured to determine a plurality of vertex positions of the fused face model by minimizing a sum of a blended target facial deformation descriptor over a face surface.

Moreover, the second processor may be further configured to generate parameters representing at least one of a stylized texture, a shading, and linework in accordance with at least one of a plurality of preconfigured rendering assets, and integrate the at least one of the stylized texture, the shading, and the linework with one or more background layers selected from the plurality of preconfigured rendering assets to render the one or more personalized digital visual representations.

In accordance with other aspects, the present disclosure relates to a computing server system deployed within a communication network for generating one or more personalized digital visual representations. The computing server system may comprise a non-transitory computer-readable storage medium; and a processor coupled to the non-transitory computer-readable storage medium and configured to: receive, from a computing device deployed within the Cloud-based communication network via a first application programming interface (API) call, one or more photos or videos of the user, process the one or more photos or videos to determine at least facial geometry characteristics of a user face model, obtain at least facial geometry characteristics of a plurality of canon characters from a character face model, generate a fused face model to retain the facial geometry characteristics of the user face model and the character face model, generate one or more personalized digital visual representations based at least upon the fused face model, save parameters relating to the fused face model on the non-transitory computer-readable storage medium, and transmit, to the computing device via a second API call, the one or more personalized digital visual representations.

In an embodiment, the computing device may be configured to render the one or more personalized digital visual representations on a display interface of the computing device.

In some implementations, the facial geometry characteristics of the user face model may comprise a plurality of three-dimensional (3D) meshes including at least data defining a connectivity between vertices, edges and faces in each of the plurality of 3D meshes.

Further, the facial geometry characteristics of the user face model may comprise parameters relating to a plurality of facial expressions.

In another embodiment, the processor may be further configured to process the one or more photos or videos to determine parameters relating to facial textures.

In some embodiments, each of the fused face model, the user face model, and the character face model may include a plurality of 3D meshes, and the processor may be further configured to allow an adjustment of a degree of geometric similarity of a selected region of the fused face model to a corresponding region of the user face model or the character face model.

In other embodiments, the processor may be configured to determine the geometric similarity based at least on local geometric descriptors including a facial deformation descriptor.

The processor may be further configured to use a blending weight map to control the geometric similarity of the selected region of the fused face model to the corresponding region of the user face model or the character face model.

In an additional embodiment, the facial deformation descriptor may measure local stretching and bending of each patch on a surface of each 3D mesh.

The processor may be further configured to determine a plurality of vertex positions of the fused face model by minimizing a sum of a blended target facial deformation descriptor over a face surface.

In accordance with further aspects, the present disclosure relates to a computer-implemented method for generating one or more personalized digital visual representations using various aspects of the system disclosed herein.

In accordance with additional aspects, the present disclosure relates to a non-transitory computer-readable storage medium storing thereon one or more programs or instructions that when executed by at least one computing device to generate one or more personalized digital visual representations to carry out the computer-implemented method disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplars pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
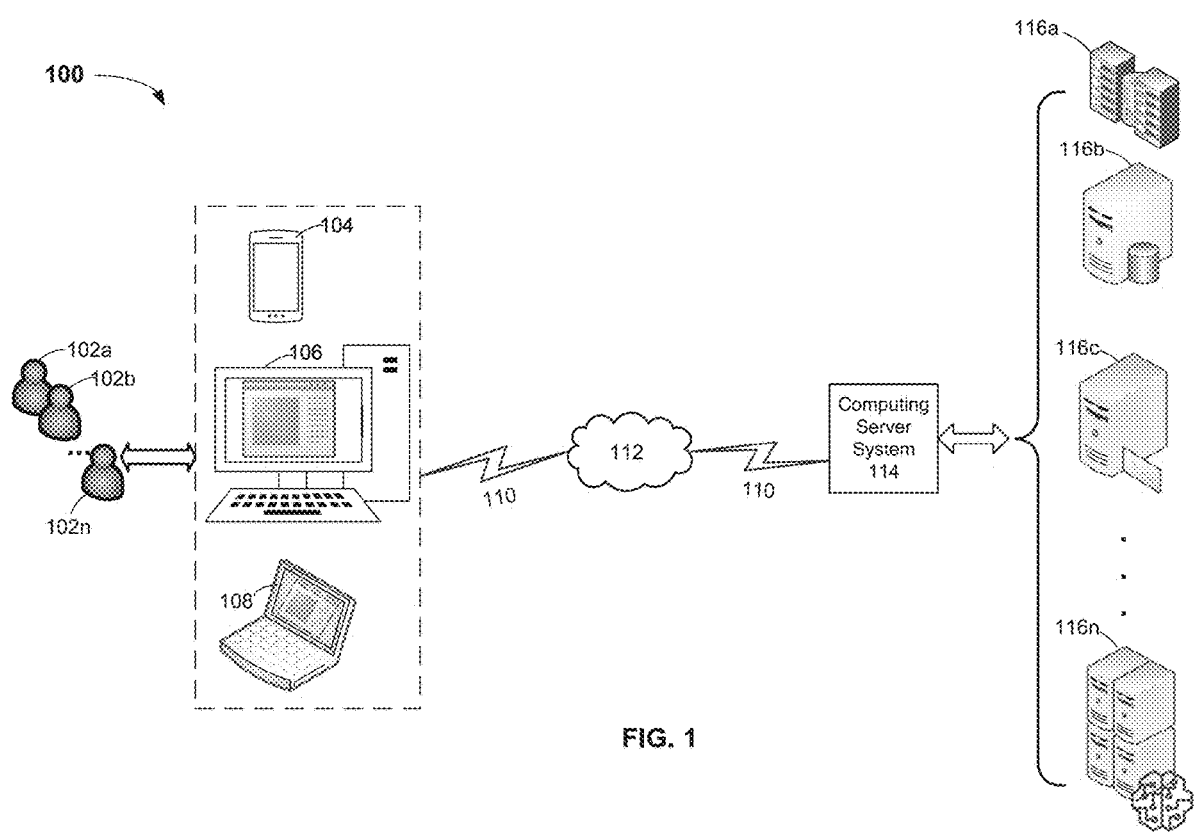
FIG. 1 illustrates a diagram of a system deployed within a computing environment and configured to generate personalized digital visual representation from user-generated photographic or video self-portraits, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Referring to FIG. 1, in accordance with aspects of the present disclosure, a computing system 100 deployed within a computing environment and communication network may be configured to obtain certain image signals (e.g., user-generated photographic or video self-portraits) from at least one user 102a, 102b . . . 102n. The computing system 100 may be further configured to automatically generate personalized digital visual representations that seamlessly integrate the visual appearance of each user 102a, 102b . . . 102n with that of an artist-designed canon character. Additionally, the computing system 100 enables fine-grained control, which may be directed by the user, the artist, or other entities, individually or in combination, to adjust the extent and specific regions where the digital visual representation resembles the user or the canon character. As will be described fully below, each artist-designed canon character of the present disclosure may include a data object that is a structured, digital representation of a character, comprising attributes such as appearance (3D/2D models, textures), behavior (animations, scripts), voice (audio files or synthesized voice data), and metadata.

In one embodiment, an application, which may be a mobile or web-based application (e.g., native iOS or Android Apps), may be downloaded and installed on a selected computing device or system 104, 106, or 108 for interacting with each user 102a, 102b . . . 102n and exchanging data and information with other computing devices deployed within the computing system 100, among other features. For example, user 102a, 102b . . . 102n may include end-users, subscribers, content creators, players, members, customers, system administrators, network administrators, software developers, and artists. Automated agents, scripts, playback software, and the like acting on behalf of one or more people may also be user 102a, 102b . . . 102n. Such a user-facing application of the computing system 100 may include a plurality of modules (e.g., a camera or any suitable optical sensors) executed and controlled by the processor of the hosting computing device or system 104, 106, or 108 for obtaining inputs such as user-generated photographic or video self-portraits. Each computing device 104, 106, or 108 hosting the mobile or web-based application may be configured to connect, using a suitable communication protocol(s) 110 and communication network 112, to a remote backend computing server system 114. Here, the communication network 112 may generally include a geographically distributed collection of computing devices or data points interconnected by communication links and segments for transporting signals and data therebetween. Communication protocol(s) 110 may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the computing system 100 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

In some embodiments, the computing server system 114 may be Cloud-based or an on-site server. The term "server" generally refers to a computing device or system or a collection of computing devices or systems, including processing hardware and process space(s), an associated storage medium such as a memory device or database, and, in some instances, at least one database application as is well known in the art. The computing server system 114 may provide functionalities for any connected devices such as sharing data or provisioning resources among multiple client devices, or performing computations for each connected client device. According to a preferred embodiment, within a Cloud-based computing architecture, the computing server system 114 may provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, central processing units (CPUs), graphics processing units (GPUs), random access memory, caches, etc.), and storage devices (e.g., network attached storages, storage area network devices, hard disk drives, solid-state devices, etc.). In addition, such resources may be used to support virtual networks, virtual machines, databases, applications, etc. The term "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), eXtendible markup language (XML), TeXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible using any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment, which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers. In certain implementations, the computing server system 114 (e.g., Cloud-based or an on-site server) of the present disclosure may be additionally configured to connect with various data sources or services such as a plurality of computing systems 116a, 116b, 116c, . . . 116n.

According to some embodiments, the user-facing application of the computing system 100 may include a plurality of modules and libraries executed and controlled by the microcontroller or processor of the hosting computing device or system 104, 106, 108 for performing functions locally on each computing device and/or making remote calls (e.g., application programming interface (API) calls) to the computing server system 114 to access specific functionalities. The division of labor between local execution and server-side operations depends on how each module or library is designed and what its functions require.

According to some implementations, one or more libraries downloaded on each selected computing device or system 104, 106, 108 may be configured to perform all their operations locally without relying on the computing server system 114. That is, once a library is installed, it may access the resources and computing power available on each computing device 104, 106, 108 to execute tasks. For example, certain libraries may be configured to perform computations locally using each computing device's CPU/GPU. Further, file handling libraries may be configured to process files stored on the local device. In one aspect, as will be described fully below, the rendering of the personalized digital visual representations may be performed either locally on each computing device 104, 106, 108, or by the computing server system 114, or partially by both.

According to other embodiments, remote execution (server-side processing) may be implemented, and libraries downloaded on each computing device 104, 106, 108 may make remote calls (e.g., API calls) to the computing server system 114 to access certain functionalities, for example, when the functions a library provides are too resource-intensive for local execution or require access to constantly updated data (e.g., real-time services, large-scale models, or databases). In this case, the library acts as a client-side interface that makes API calls or requests to the computing server system 114 to perform specific tasks.

In one example, a library may interface with services like OpenAI's GPT, Google Cloud AI, Claude Sonnet, or Amazon S3, where the computation may be carried out on the computing server system 114, and the selected computing device 104, 106, 108 sends requests and receives results. In another example, libraries like AWS SDK, Google Cloud SDK may allow interaction with Cloud storage to upload, retrieve, and manipulate data on the Cloud.

Server-side processing may offload heavy computation to powerful servers, provide access to real-time data and updated services, and being device-agnostic by working even on devices with limited resources (smartphones, tablets, etc.). In one embodiment, the computing server system 114 or at least one of a plurality of computing systems 116a, 116b, 116c, . . . 116n accessible by the computing server system 114 via e.g., API calls, may be configured to provide server-side processing.

According to additional embodiments, libraries implemented on each selected computing device 104, 106, 108 may adopt a hybrid model, where some operations or computations may be performed locally, while more complex or resource-intensive tasks are offloaded to the computing server system 114. For example, basic computations, preprocessing, or user interface elements may be handled locally, while complex processing, data retrieval, or heavy computations (e.g., interacting with databases or running large AI/ML models) may be carried out via the computing server system 114.

Figure 2:
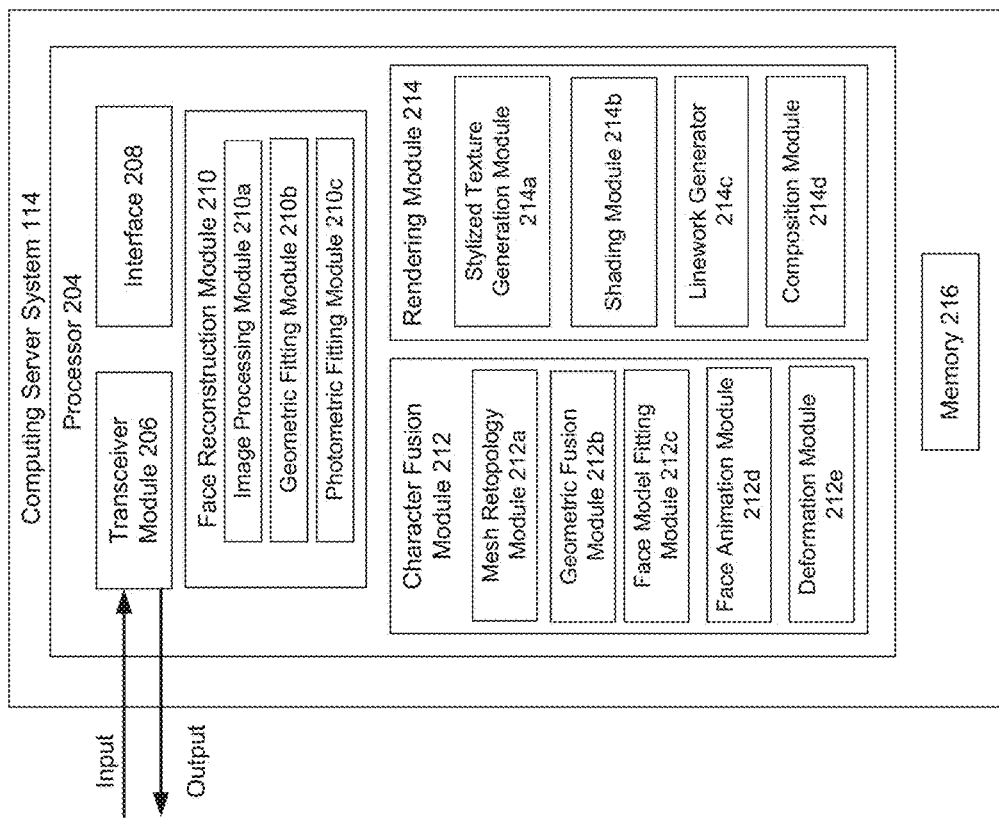
FIG. 2 illustrates a block diagram of the computing server system of FIG. 1, according to an exemplary aspect of the present disclosure.

Referring now to FIG. 2, in accordance with aspects of the present disclosure, at least one processor 204 of the computing server system 114 may be configured to control and execute a plurality of modules which may include a transceiver module 206, an interface 208, a face reconstruction module 210, a character fusion module 212, and a rendering module 214. In one embodiment, the face reconstruction module 210 may include an image processing module 210a, a geometric fitting module 210b, and a photometric fitting module 210c. The character fusion module 212 may include a mesh retopology module 212a, a geometric fusion module 212b, a face model fitting module 212c, a face animation module 212d, and a deformation module 212e. Further, the rendering module 214 may include a stylized texture generation module 214a, a shading module 214b, a linework generator 214c, and a composition module 214d. The term "module" or "generator" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special purpose device. A module or generator may also be implemented as a combination of the two, with certain functions facilitated by hardware alone, and other functions facilitated by a combination of hardware and software. Each module or generator may be realized in a variety of suitable configurations, and should not be limited to any example implementation exemplified herein.

Memory 216, which is coupled to the processor 204, may be configured to store at least a portion of information obtained and generated by the computing server system 114. In one aspect, the memory 216 may be a non-transitory machine readable medium configured to store at least one set of data structures or instructions (e.g., software) embodying or utilized by at least one of the techniques or functions described herein. It should be appreciated that the term "non-transitory machine readable medium" may include a single medium or multiple media (e.g., one or more caches) configured to store at least one instruction. The term "machine readable medium" may include any medium that is capable of storing, encoding, or carrying instructions for execution by all modules of a computing device and that cause these modules to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The transceiver module 206 of the computing server system 114 may be configured by the processor 204 to exchange various information and data with other computing devices deployed with the computing system 100. For example, the transceiver module 206 may receive an input including a self-portrait photograph or a short video of a user, typically taken with an electronic camera or image capturing device or a smartphone with a built-in camera (e.g., at least one of the computing devices or systems 104, 106, or 108 of FIG. 1).

The interface 208 may be configured by the processor 204 to provide various communication and interaction functions between various software components, hardware components, or users. For example, the interface 208 may provide a set of functions or protocols for other components to interact with a particular system or service, or be a physical device or circuitry that connects different electronic components or systems. In one embodiment, the mobile or web-based application of the present disclosure may be a thin client device/terminal/application deployed within the computing system 100 and may be configured to perform certain preliminary processing of data. Thereafter, the pre-processed data may be transmitted to the computing server system 114 for further processing. In an implementation, the interface 208 may include an API interface configured to make one or more API calls therethrough. According to another implementation, the computing server system 114 may include an API gateway device (not shown) configured to receive and process API calls from various connected computing devices deployed within the computing system 100 (e.g., an operating system, a library, a device driver, an API, an application program, software or other module). Such an API interface or gateway device may specify one or more functions, methods, classes, objects, protocols, data structures, formats and/or other features of the computing server system 114 that may be used by the mobile or web-based application. For example, the API interface may define at least one calling convention that specifies how a function associated with the computing server system 114 receives data and parameters from a requesting device/system and how the function returns a result to the requesting device/system. It should be appreciated that the computing server system 114 may include additional functions, methods, classes, data structures, and/or other features that are not specified through the API interface and are not available to a requesting computing device.

Figure 3:
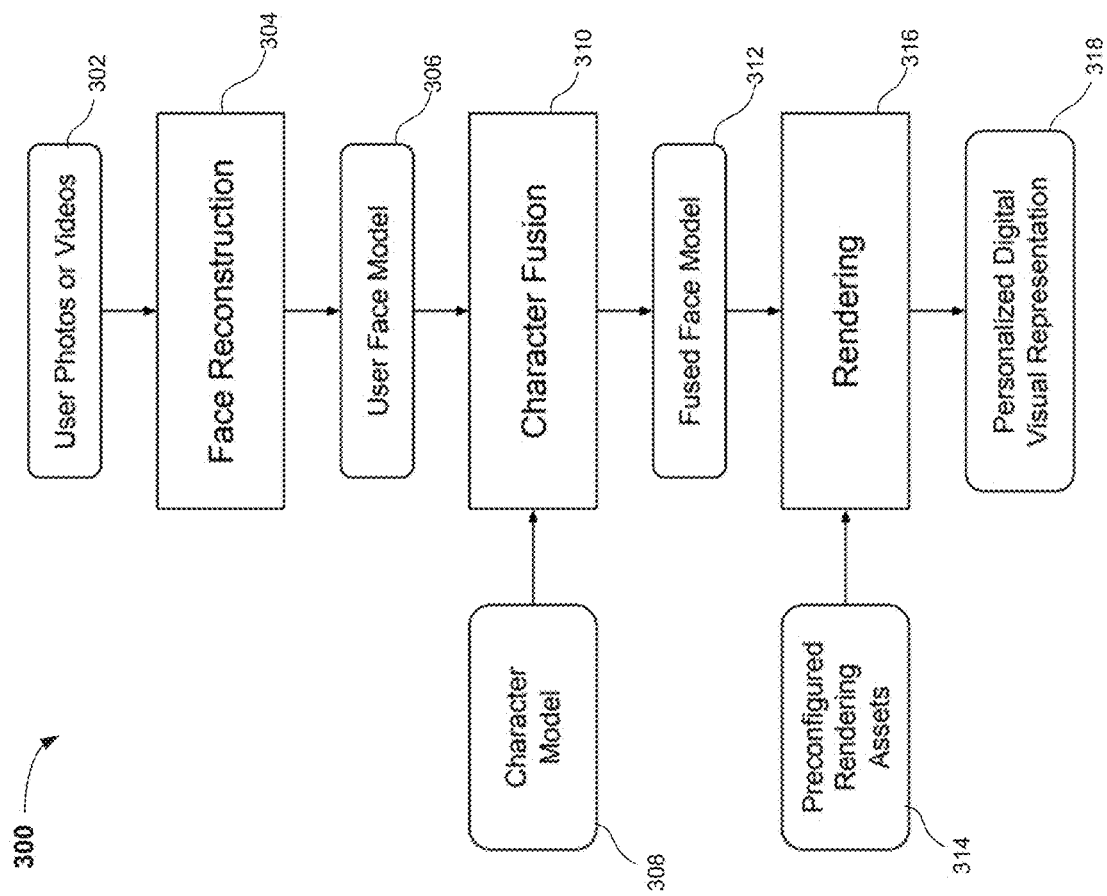
FIG. 3 illustrates an overall workflow of generating personalized digital visual representations from user-generated photographic or video self-portraits, according to an exemplary aspect of the present disclosure.

FIG. 3 illustrates an overall workflow 300 of generating renderings of personalized digital visual representations from user-generated photographic or video self-portraits, in accordance with aspects of the present disclosure. For example, the computing server system 114 may be configured to take as input a collection of user photos or videos 302, and then invoke the face reconstruction module 210, the character fusion module 212 and the rendering module 214, in a sequential order to generate renderings of personalized digital visual representations. The user's photos or videos 302 may be obtained via e.g., a built-in or externally connected camera or image capture device of a computing device (e.g., the computing device or system 104, 106, or 108 of FIG. 1). In another embodiment, one or more photos and videos stored on the computing device or system 104, 106, or 108 may be uploaded to the computing server system 114. The user photos or videos 302 may capture various features of a user's face from one or multiple angles.

In implementing a face reconstruction process 304, the face reconstruction module 210 may be configured by the processor 204 to take as input a collection of user photos or videos 302, use the image processing module 210a to process the input 302, and use the geometric fitting module 210b and photometric fitting module 210c to estimate and output a user face model 306. In some aspects, the user face model 306 may comprise at least the user's facial geometry and may also include the user's facial appearance properties such as texture maps encoding albedo, reflectance, and roughness parameters. Additionally, the user face model 306 may include a representation of facial segmentation that assigns values to points on the facial geometry based on predefined semantics categories. These categories may include, but are not limited to, the left eye, right eye, nose, lips, facial hair, left ear, right ear, and other facial features. The representation of facial segmentation may be implemented as a semantic label texture map, where each texel is assigned a discrete semantic label, or a multi-channel texture map, with each channel storing the probability that a given texel belongs to a particular semantic category. A texel (short for "texture element") refers to the smallest unit of a texture map, which represents a 2D image used to apply visual details such as colors, patterns, or materials to a 3D object. In certain implementations, a texel may be the equivalent of a pixel in the texture image, but it is specifically used in the context of textures applied to 3D surfaces. Furthermore, the user face model 306 may include expression-related information that enables computation of facial geometry and surface appearance properties of the user corresponding to different facial expressions.

In implementing a character fusion process 310, the character fusion module 212 may be configured to take as input the user face model 306 determined by the face reconstruction module 210, and an artist-designed character model 308 to generate a fused face model 312. In some aspects, the character model 308 may comprise at least one or more facial geometries of a canon character, each corresponding to a different preconfigured facial expression. The fused face model 308 may comprise at least a facial geometry that may combine the local and global geometric characteristics from both the user's and the artist-designed character's facial geometry. As will be described fully below, the character fusion process 310 may be configured to select and adjust, either by an end-user or an artist, for each local patch on an output face mesh, the degree of geometric similarity to the two input meshes representing the user's and the selected artist-designed character's facial geometries. In one embodiment, the geometric similarity may be measured by local curvature and/or other local geometric descriptors. The fused face model 312 may also include facial appearance properties such as texture maps encoding albedo, reflectance, and roughness parameters. Additionally, the fused face model 312 may include a representation of facial segmentation similar to those contained in the user face model 306. Furthermore, the fused face model 312 may include expression-related information that enables computation of facial geometry and surface appearance properties corresponding to different facial expressions, where the computed facial geometry may combine the local and global geometric characteristics from both the user's and the artist-designed character's facial geometry corresponding to the given facial expression.

In implementing a rendering process 316, the rendering module 214 may be configured to generate a personalized digital visual representation of the user 318, based at least in part on the fused face model 312 computed by the character fusion module 212, and preconfigured rendering assets 314 produced by artists. The personalized digital visual representation may comprise one or more images or videos, including, but not limited to, renderings of the fused face model 312. In certain embodiments, this personalized digital visual representation 318 may be rendered on a local computing device (e.g., via the application downloaded and installed on a selected computing device or system 104, 106, or 108 for interacting with each user 102a, 102b . . . 102n), such as a smartphone, tablet, personal computer, or game consoles, thereby enabling real-time interactive user experience. Within such embodiments, the rendering module 214 may be further configured to receive and process inputs from the local computing device (e.g., one of the computing devices or systems 104, 106, or 108), including but not limited to keyboard input, mouse input, game controller input, touch screen input, camera feeds, accelerometers, and gyroscopes, in order to render the personalized digital visual representation 318.

In one embodiment, the preconfigured rendering assets 314 may include various data and parameters relating to iconic elements and components of artist-designed canon characters. These data and parameters may be stored on e.g., memory 216 or any suitable data storage computing system deployed within the computing system 100 and accessible by the computing server system 114 (e.g., one of the plurality of computing systems 116a, 116b, 116c, . . . 116n). For example, a plurality of 3D models (e.g., 3D meshes, topologies, and level of detail) of various artist-designed canon characters may define the geometric structures of each 3D model comprising vertices, edges, and polygons (e.g., triangles or quads), the arrangement of polygons, which may determine deformation, animation, and optimization, and versions of each mesh at varying resolutions to ensure performance optimization for different rendering distances. Textures data and parameters may also be included such as texture maps and resolution information. For example, texture maps may include but not limited to diffuse/base color maps for defining the color and visible details of a surface, normal maps configured to simulate surface detail like bumps without increasing mesh complexity, specular or glossiness or metallic or roughness maps which may define reflectivity or how light interacts with the surface, ambient occlusion maps which may be configured to add shadowing to crevices and fine details for a more realistic appearance, and emissive maps for controlling self-illumination of specific areas. Resolution information may be measured, represented and stored in pixels (e.g., 1024×1024, 2048×2048).

In another embodiment, the preconfigured rendering assets 314 may include various shaders. A shader may refer to a small program or script designed to run on a CPU/GPU to control how surfaces, textures, and materials appear on 3D objects within a rendered scene. Shaders may be used to create visual effects, add realism, or stylize the appearance of objects in 3D environments. For example, the preconfigured rendering assets 314 may include data and parameters relating to various material properties for defining how each asset interacts with light (e.g., metallic, matte, translucent, subsurface scattering for skin, etc.). Different shader models may be used such as preconfigured lighting and rendering rules to mimic physical or stylized effects. Custom shaders may be incorporated to enable specific artistic or unique effects tailored to a selected design.

Furthermore, in certain embodiments, the preconfigured rendering assets 314 may include rigging and animation data. For example, a rig may include a hierarchical skeleton structure within each asset for animation. Joint count and placement data may be used for generating natural movements. Inverse kinematics data may simplify animations like walking or hand movements. Weight painting data may assign influence of each bone to mesh vertices for smooth deformation. Blendshapes or morph targets data may be used for facial expressions, lip-syncing, or morphing. In addition, various animation clips may be included to define prebuilt motions such as walking, running, or gestures.

The preconfigured rendering assets 314 may also include lighting data. For example, preconfigured lighting setups may define how each asset looks under various light conditions. High dynamic range imaging may be used to provide environments for dynamic lighting setups.

Audio metadata may be included in the preconfigured rendering assets 314 too. For example, lipsync data may define parameters that align facial animations with audio. Trigger points may synchronize specific actions or animations with sounds.

Interoperability may be provided by the preconfigured rendering assets 314. For example, common file formats handled by the computing system 100 may relate to models (e.g., FBX, OBJ, GLTF/GLB), textures (e.g., PNG, JPEG, TIFF), animations (e.g., BVH, FBX). Compatibility may be provided as well. For example, certain elements of the preconfigured rendering assets 314 may be designed to work with specific engines (e.g., Unity, Unreal Engine) or platforms.

According to some implementations, performance optimization may be provided by the preconfigured rendering assets 314. For example, polygon count may balance visual quality with performance requirements. Atlas textures may be used to combine multiple textures into a single sheet to reduce draw calls. Bake maps may be used to reduce rendering computations by precomputing certain effects.

Customization parameters may be included in the preconfigured rendering assets 314. For example, different morphing options may allow end users to adjust features like body shape, facial features, or clothing details. Materials libraries may enable quick swapping of looks and styles. Various color palettes may provide predefined or customizable colors for different parts of the asset.

The preconfigured rendering assets 314 may additionally include documentation and metadata. For example, various specifications may provide guidelines for using and integrating each asset. Metadata tags may be used to provide information like asset name, type, version, and dependencies.

Figure 4:
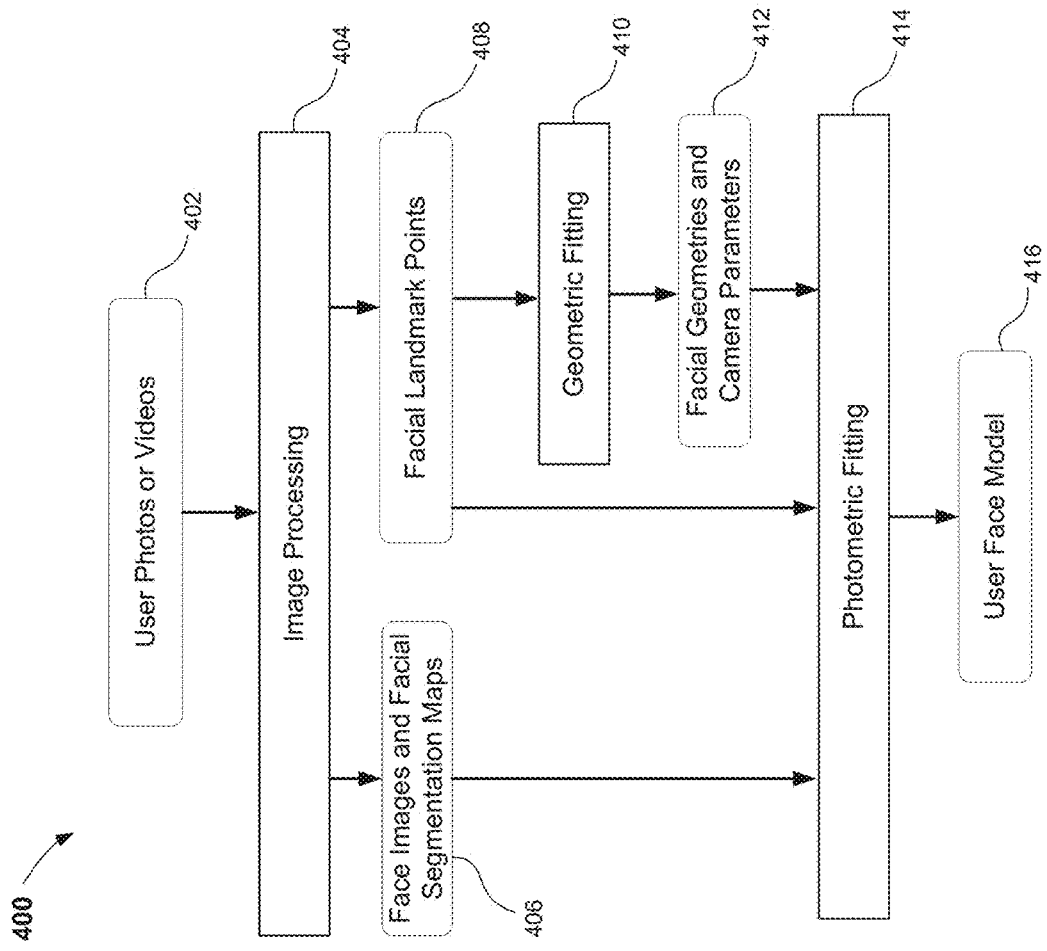
FIG. 4 illustrates a workflow of a face reconstruction process, according to an exemplary aspect of the present disclosure.

FIG. 4 illustrates a workflow 400 of a face reconstruction process for generating a user face model 416 in accordance with aspects of the present disclosure. According to some implementations, the face reconstruction module 210 may be configured to take as input a collection of user photos or videos 402. User photos or videos 402 may contain different facial expressions of a user and may be taken under different lighting conditions.

According to the one embodiment, referring to FIGS. 2 and 4, the generation of a user face model 416 by the face reconstruction module 210 may generally include three steps: image preprocessing 404 via the image processing module 210a, geometric fitting 410 via the geometric fitting module 210b, and photometric fitting 414 via the photometric fitting module 210c.

Image processing 404 may take the user photos or videos 402 as input and extract face images and facial segmentation maps 406 and facial landmark points 408 associated with each face image. If a photo is included in the input 402, it is loaded as an image, which in this context means a rectangular grid of colored pixels. When a video is included in the input 402, it may first be converted into a sequence of images corresponding to a subset of all video frames. In one embodiment, an input video may be compressed by a video codec associated with a computing device that makes use of intro-coded frames, or I-frames. Each I-frame may be fully encoded and may not depend on any other frames for decoding. That is, each I-frame may contain all the information needed to reconstruct the image for that specific frame. I-frames may serve as reference points for decoding subsequent frames, such as P-frames (Predicted frames) and B-frames (Bi-directional predicted frames). Because they are independently compressed without relying on adjacent frames, I-frames may have higher data sizes compared to other frame types. In one embodiment, to achieve compression efficiency, I-frames may be used sparingly, typically at the start of a video sequence or at regular intervals (e.g., every 2-5 seconds). Next, a subset of all I-frames may be extracted from the input video to create a sequence of images. In one embodiment, if the total number of extracted I-frames exceeds a predefined threshold value, the subset of size equal to the threshold value may be chosen by picking I-frames at fixed intervals. In another embodiment, all I-frames may be extracted from the user videos 402. As a result, the image processing module 210a may be configured to ensure that both photos and videos in the input 402 are converted into a collection of images and stored on e.g., memory 216 or any suitable data storage computing system deployed within the computing system 100 and accessible by the computing server system 114 (e.g., one of the plurality of computing systems 116a, 116b, 116c, . . . 116n).

Thereafter, a preconfigured facial landmark detector such as off-the-shelf facial landmark detectors available in Dlib, OpenCV, and MediaPipe, may be applied to each image in the collection of images converted from the input 402, producing for each image a list of facial landmark points 408, which are image locations of predefined facial landmarks that may include, but not limited to, the corners of the eyes, the base of the nose, the boundary points of the lips, and the jawline contour. These facial landmark points 408 may be used to identify the approximate facial region of the image. In one embodiment, each image may be padded and cropped by a bounding box computed based off these facial landmark points 408 to approximately enclose the face of the user in each image. The cropped images may be resized to a configurable predefined size (e.g., 512×512 pixels in one embodiment) to produce the final face image 406. The coordinates of the facial landmark points 408 may be affinely transformed to match the new coordinate system of the cropped-and-resized face images 406.

Furthermore, a preconfigured facial parser may be executed to produce a facial segmentation map 406 for each face image. A facial parser is a computational model or algorithm designed to analyze facial images and segment them into distinct semantic regions, such as eyes, nose, mouths, ears, and facial skins. The segmentation map may assign a discrete label to each pixel in the image, or alternatively, be represented as a multi-channel map, where each channel may store the probability that a given pixel belongs to a specific semantic category. Example facial parsers may use MediaPipe Face Mesh and FaceParsing-PyTorch.

In summary, the image processing step 404 may generate a collection of face images 406 of predefined dimensions, along with corresponding segmentation maps 406 and facial landmark points 408 for each face image. These outputs 406, 408 may be transmitted to the geometric fitting step 410 and photometric fitting step 414, as shown in FIG. 4, for further processing.

In some embodiments, the geometric fitting step 410 may estimate facial geometries and camera parameters 412 for each face image. This step coarsely aligns the facial geometries with the detected facial landmark points 408 and providing a foundation for subsequent photometric fitting 414.

In some embodiments, the estimated camera parameters for the i-th face image may include camera rotation $R_i$, camera translation $t_i$, and field of view (FOV) angle $\theta_i$. The estimated facial geometries may be defined using a predefined 3D Morphable Face Model (MFM), also referred to in the literature as a 3D Face Morphable Model (3DMM). An MFM is a statistical model that generates a 3D face mesh from a fixed set of coefficients, enabling parametric control over facial shape and appearance. In one embodiment, the FLAME model may serve as the predefined MFM. The coefficients of an MFM may be partitioned into identity coefficients, which encode subject-specific facial structure, and expression coefficients, which encode expression-specific and other subject-independent facial structure. Since all face images may correspond to the same individual, a single vector of identity coefficients, $C^{id}$, may be estimated for all face images, while each face image may have its own vector of expression coefficients $C_i^{ex}$ (where i indexes face images). In this manner, the estimated facial geometries for all face images are encoded as the MFM coefficient vectors $C^{id}$ and $\{C_i^{ex}\}$.

The geometric fitting step 410, performed by the geometric fitting module 210b, may also utilize a predefined landmark-to-mesh correspondence table (not shown). This table may be used to determine the 3D point on the facial geometry corresponding to each facial landmark point 408 detected in the image processing step 404. For clarity, the 3D point on the facial geometry corresponding to a given facial landmark point 408 may be referred to as the 3D landmark point corresponding to the facial landmark point 408. Since the 3D face meshes generated by the MFM share the same mesh connectivity information, the landmark-to-mesh correspondence table may be represented as a list of face indices specifying which triangle in the MFM-generated 3D mesh each 3D landmark point lies on, along with its barycentric coordinates relative to the indexed face. Barycentric coordinates are a coordinate system used in geometry to express the position of a point relative to the vertices of a triangle (or a simplex in higher dimensions).

The geometric fitting step 410 may estimate the facial geometries and camera parameters 412, encoded by $C^{id}$ and $\{(R_i, t_i, \theta_i, C_i^{ex})\}$, by minimizing at least one geometric fitting error, $E_{geo}$, that measures the discrepancy between the facial landmark points 408 detected in the image processing step 404 and their corresponding 3D landmark points projected onto the 2D image plane by a corresponding camera:

$$E_{geo} = \sum_i \sum_j \|l_{i,j} - P(q_{i,j}, R_i, t_i, \theta_i)\|^2,$$

where: i indexes over face images; j indexes over facial landmarks predefined by the facial landmark detector;

$l_{i,j}$ is the j-th facial landmark point detected on the i-th face image; $q_{i,j}$ is the 3D position of the j-th 3D landmark point, computed by evaluating the MFM using the estimated identity coefficients $C^{id}$ and expression coefficients $C_i^{ex}$, and then performing looking up using the landmark-to-mesh correspondence table; and finally $P(q_{i,j}, R_i, t_i, \theta_i)$ is the projected 2D position of $q_{i,j}$ based on the estimated camera parameters $R_i$, $t_i$, and $\theta_i$.

The minimization may be performed using a gradient-based solver such as Adam or LBFGS with gradients evaluated using automatic differentiation. Additional regularization terms may be included in the minimization to ensure that the coefficient vectors and camera parameters remain plausible. These terms may include L2 regularization on the identity and expression coefficients and prior knowledge-based regularization on camera parameters.

Still referring to FIG. 4, the photometric fitting step 414 may refine the initial facial geometries and camera parameters 412 produced by the geometric fitting step 410 and estimate lighting parameters and facial albedo color by comparing the input face images 406 with renderings based on the current estimates of facial geometries, camera parameters, lighting parameters, and facial albedo color.

In certain embodiments, the facial geometries estimated during the photometric fitting step 414 may be represented by a single identity coefficient vector $C^{id}$, per-face-image expression coefficient vectors $\{C_i^{ex}\}$, and an additional per-vertex scalar displacement field, where the coefficient vectors are initialized from the output from the geometric fitting step 410. For example, the per-vertex scalar displacement field may be applied by first evaluating the MFM using the estimated identity and expression coefficients to get 3D meshes, then computing their per-vertex normals, and finally displacing mesh vertex positions along the per-vertex normals by the associated scalar displacement. The same per-vertex scalar displacement field may be shared across all face images. The estimated camera parameters for each face image may be represented using a camera rotation, a camera translation, and a FOV angle just as in the geometric fitting step 410. The estimated lighting parameters 412 may be represented using spherical harmonics coefficients of a preconfigured order (e.g., order 3 in one embodiment). The estimated facial albedo color may be represented as a 2D color texture map defined with respect to the 3D mesh generated by the MFM. The same facial albedo texture may be shared across all face images.

The photometric fitting step 414 performed by the photometric fitting module 210c may use a photometric fitting error $E_{photo}$ to measure the difference between input face images 406 and renderings made from the various estimated parameters, $$E_{photo} = \sum_i \sum_{x,y} \|I_i(x, y) - Q_i(x, y)\|^2,$$

where: i indexes over the face images; (x, y) indexes over pixels; $I_i$ is the i-th face image; and $Q_i$ is the image generated by a differentiable renderer using estimated facial geometry, camera parameters, and lighting parameters for the i-th face image and the estimated facial albedo color. The differentiable renderer may employ a diffuse shading model to compute pixel colors.

The photometric fitting step 414 may minimize a total energy function which includes not only the photometric fitting error $E_{photo}$, but also the geometric fitting error $E_{geo}$ as used by the geometric fitting step 410, along with various regularization terms. This minimization may be performed to estimate the identity and expression coefficient vectors, the scalar per-vertex displacement field, the facial albedo color texture, the camera parameters, and the lighting parameters. The regularization terms may include norm constraints on the optimization variables, image-space smoothness constraints on the facial albedo color texture, and geometric smoothness constraints on the estimated facial geometries. The optimization may be performed using a gradient-based optimizer such as Adam or LBFGS with gradients computed via automatic differentiation.

After the optimization, the photometric fitting step 414 may output, as part of a user face model 416, the identity coefficient vector and the per-vertex displacement field, which together define the user's facial geometry. The user's facial geometry corresponding to different facial expressions may be computed by at least evaluating the MFM using the identity coefficient vector in combination with an expression coefficient vector that encodes a selected facial expression, followed by applying the per-vertex scalar displacement field.

The photometric fitting step 414 may also output, as part of a user face model 416, the estimated facial albedo color texture, which specifies the user's facial surface appearance.

Furthermore, the photometric fitting step 414 may utilize the facial geometries and camera parameters estimated during the photometric fitting step to unproject the facial segmentation maps 406 from image space to texture space, resulting in facial segmentation textures. A separate facial segmentation texture may be computed for each camera view by projecting the corresponding 3D facial geometry into the camera's image plane. These facial segmentation textures, derived from multiple camera views, may then be combined using a weighting scheme. The weights may be determined based on the visibility of each texel point in the corresponding camera view, such as by using a visibility test (e.g., z-buffering), or by averaging contributions from all views, weighted by the texel's projected areas in different views. In this manner, facial segmentation maps 406 for different face images 406 may be unified into a single facial segmentation texture. The resulting facial segmentation texture may be included as part of the user face model 416 to represent facial segmentation.

It should be appreciated that the face reconstruction module 210 may be implemented using any selected techniques. For example, the computing server system 114 may host, train and operate at least one deep learning and neural networks (e.g., at least one of the computing systems 116a, 116b, 116c, . . . 116n of FIG. 1). In one embodiment, one or more convolutional neural networks (CNNs) may be employed for identifying and processing facial features from images. CNNs may segment and recognize detailed facial landmarks with high precision. In yet another embodiment, CNNs may be trained to predict facial geometries, textures, lighting parameters, and camera parameters, directly from 2D inputs. Furthermore, neural radiance fields (NeRF) may be used to reconstruct 3D scenes containing faces from photos, and 3D face meshes and textures may be extracted from NeRFs-based reconstruction.

If multiple angles are available (e.g., from user photos or videos 402), structure-from-motion (SfM) may be used by the computing server system 114 to reconstruct the 3D geometry by matching points across frames and estimating camera positions. In addition, for images with known stereo pairs or multiple views, stereo photogrammetry may be used to provide precise depth estimation for each point in the face.

According to other embodiments, depth estimation and shape-from-X techniques may be used by the computing server system 114 to carry out a highly accurate facial reconstruction process. For example, monocular depth estimation may be performed via using deep networks trained on large datasets, thereby predicting depth maps directly from single images. In one implementation, shape-from-shading technique may be incorporated to leverage variations in lighting to estimate the surface normal and reconstruct fine details of the face. Photometric stereo techniques may be used by the computing server system 114 to analyze multiple images under varying light directions to estimate surface details by resolving complex lighting interactions.

In certain implementations, physics-based modeling may be used by the computing server system 114. For example, soft tissue simulation may be configured to model the biomechanics of facial skin, muscles, and underlying structures for realism, especially in dynamic expressions. Facial biomechanics techniques may be used to integrate knowledge of muscle anatomy and bone structure to constrain reconstruction within plausible limits.

Cross-modal fusion techniques may be implemented in some embodiments. For example, speech-driven facial dynamics may be used by the computing server system 114 to combine audio and visual inputs to improve facial movement accuracy in speech-related expressions.

Alternatively, semantic priors and AI-assisted techniques may be used by the computing server system 114. For example, prior knowledge augmentation may be used to incorporate priors like average face shapes, statistical facial models, and symmetry constraints to fill in incomplete or occluded regions.

In further embodiments, augmented datasets may be used by the computing server system 114 to leverage datasets with varying poses, lighting, and expressions in order to improve model generalization. Alternatively, the computing server system 114 may train reconstruction models on diverse datasets (synthetic, real-world, and augmented) to achieve a broader applicability.

Figure 5:
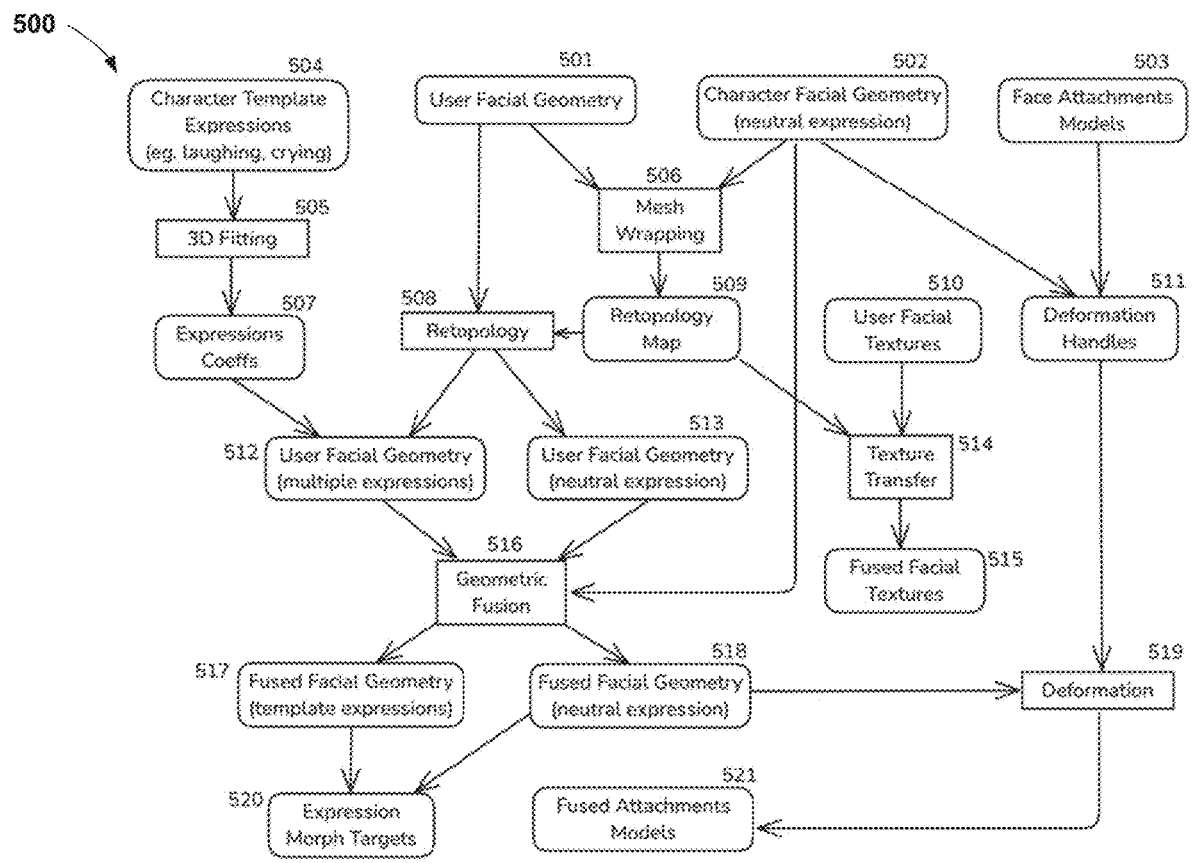
FIG. 5 illustrates a workflow of a character fusion process, according to an exemplary aspect of the present disclosure.

FIG. 5 illustrates a workflow 500 of a character fusion process for generating a fused face model 312 from a character model 308 and the user face model 306 produced by the face reconstruction process 304, according to aspects of the present disclosure.

According to one embodiment, the character model 308 may comprise a character facial geometry 502, character template expressions 504, and face attachments models 503. The character facial geometry 502 may be stored on one of the plurality of computing systems 116a, 116b, 116c, . . . 116n deployed within the computing system 100 and accessible by the computing server system 114. The character facial geometry 502 may be configured to include information and data relating to triangular meshes of a selected canon character. The face attachments models 503 may include information and data relating to facial attachments, such as facial hair, earrings, teeth, etc. The user facial geometry 501 refers to the facial geometry specified in the user face model 306 generated by the face reconstruction process 304. The user facial textures 510 refer to the various facial textures, e.g., facial albedo color texture, and facial segmentation texture, that may be part of the user face model 306 generated by the face reconstruction process. In one embodiment of the face reconstruction step 304, if the user facial geometry 501 is represented by the MFM identity coefficient vector as described earlier, the character fusion module 212 may be configured to use this identity coefficient vector along with the MFM to reconstruct the triangular mesh representation of the user's face for a specific facial expression encoded by a given expression coefficient vector.

If the meshes specified respectively by the user facial geometry 501 and the character facial geometry 502 are of different topologies, a mesh retopology step 508 performed by the mesh retopology module 212a may be performed on one or both of the meshes to convert them to the same vertex ordering and connectivity. According to one embodiment, the retopolgy step 508 may be performed by resampling the mesh using barycentric coordinates loaded from a retopology map 509, which is generated offline in a mesh wrapping step 506. According to one implementation, the mesh wrapping step 506 may wrap the geometry of one face model to another using software packages such as the R3DS Wrap, and store the retopology map to e.g., memory 216. The retopology step 508 may output a neutral expression user facial geometry 513 and store it in e.g., memory 216 or any suitable data storage computing system deployed within the computing system 100 and accessible by the computing server system 114 (e.g., one of the plurality of computing systems 116a, 116b, 116c, . . . 116n).

According to other embodiments, multiple facial expressions may be handled by the character fusion module 212 of FIG. 2. For example, a 3D geometry fitting step 505 performed by the face model fitting module 212c may be carried out by the character fusion module 212 to fit the MFM to artist created template facial geometry models corresponding to different expressions 504. In one implementation, a gradient descent based method may be applied to determine the MFM coefficients that minimize vertex distances to a target mesh, and the resultant expression coefficients 507 may be saved in e.g., memory 216. These coefficients 507 may be combined with identity coefficients in the user facial geometry 501 to reconstruct the triangular meshes of the user's face 512 corresponding to multiple facial expressions.

If a retopology step 508 is not executed, the user facial textures 510 may be directly used as the fused facial textures 515. Otherwise, texture transfer 514 may be performed by resampling each facial texture included in the user facial textures 510 on the new user facial geometry 513. This may be implemented either on a CPU (e.g., processor 204 and/or the processor of the hosting computing device or system 104, 106, or 108) using pixel bilinear interpolation or on a GPU (e.g., processor 204 and/or the processor of the hosting computing device or system 104, 106, or 108) by rendering the flattened face mesh using texture coordinates as vertex positions, and storing the output textures 515 to e.g., memory 216 or any suitable data storage computing system deployed within the computing system 100 and accessible by the computing server system 114 (e.g., one of the plurality of computing systems 116a, 116b, 116c, . . . 116n). In this manner, each facial texture included in the user facial texture 510, e.g., facial albedo color texture and facial segmentation texture, may have a resampled version in 515 that is compatible with the new user facial geometry 513.

In accordance with important aspects, the geometric fusion module 212b may be configured to perform geometric fusion 516 using the outputs obtained from the user facial geometry 512 (multiple expressions) or 513 (neutral expression), and the character facial geometry 502 to respectively generate fused facial geometry 517 (one or more template expressions) and 518 (neutral expression).

In yet another embodiment, the geometric fusion module 212b may be invoked multiple times to perform geometric fusion 516 for different expressions, and the outputs may be converted to morph targets by the face animation module 212d. The face animation module 212d may compute the vertex offsets of the meshes corresponding to different expressions against the neutral expression mesh to create the morph targets 520. These morph targets 520 may be stored to e.g., memory 216 or any suitable data storage computing system deployed within the computing system 100 and accessible by the computing server system 114 (e.g., one of the plurality of computing systems 116a, 116b, 116c, . . . 116n).

For each facial attachments model 503, the character fusion module 212 may be configured to determine a set of vertices on the attachment mesh whose distances to the original character face mesh 502 surface are within a selected threshold, and project them onto the face mesh surface as deformation handles 511. For example, after generating the fused facial geometry 518, the character fusion module 212 may compute new 3D positions of the deformation handles on the new surface mesh, and use a geometric deformation step 519, implemented by the deformation module 212e, to compute the 3D positions of the rest of the vertices of the attachment mesh, and store it as the fused attachment models 521 to e.g., memory 216 or any suitable data storage computing system deployed within the computing system 100 and accessible by the computing server system 114 (e.g., one of the plurality of computing systems 116a, 116b, 116c, . . . 116n).

According to one embodiment, the geometric fusion module 212b may output a fused face model 312 which comprises the fused facial geometry for neutral expression 518, the fused facial geometries in template expressions 517, the expression morph targets 520, the fused facial textures 515, and the fused attachment models 521. Facial geometry corresponding to different facial expressions may be computed from the fused facial geometry for neutral expression 518 and the expression morph targets 520 using selected techniques of morph target animation (also referred to as blend shape animation).

Figure 6:
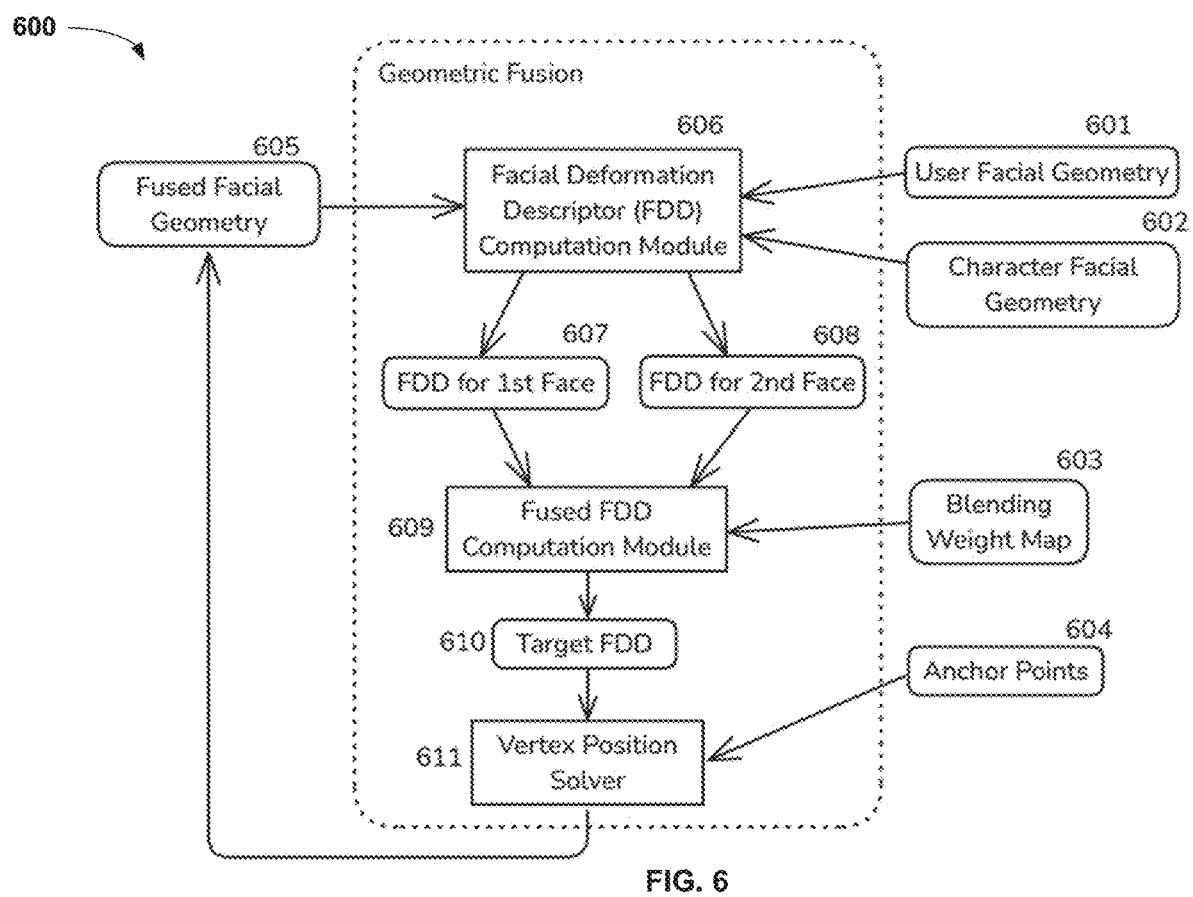
FIG. 6 illustrates a workflow of a geometric fusion process, according to an exemplary aspect of the present disclosure.

Referring now to FIGS. 2 and 6, in accordance with aspects of the present disclosure, an example geometric fusion process 600, that may be performed by the geometric fusion module 212b of the character fusion module 212, may combine geometric characteristics and idiosyncrasies of two faces to produce a fused face model. Here, "idiosyncrasies" may generally refer to the unique and individual facial features or characteristics that distinguish one person from another. These may include subtle details such as the shape of facial features, the placement of the eyes, the curve of the jawline, or distinctive skin patterns.

According to some embodiments, the geometric fusion module 212b may takes two main inputs: the two input facial geometries 601, 602, and two auxiliary inputs: a blending weight map 603 and a set of anchor points 604.

The two input facial geometries 601, 602 may be in the form of triangular meshes, each defined by a set of 3D vertices and a set of edges connecting them to form triangles.

In one aspect, the blending weight map 603 may include a set of values either defined on each vertex or each face of the 3D mesh, or defined on each pixel in the texture space according to one parameterization of the 3D mesh surface.

The anchor points 604 are a set of vertices on the triangular meshes of the input facial geometries 601, 602 whose 3D positions remain unchanged during the geometric fusion process.

In one embodiment, the triangular meshes may be manifolds and share the same topology. Otherwise, a retopology step (e.g., retopology 508 of FIG. 5) may be performed to convert them to a common manifold topology.

In the context of character fusion implementation of the present disclosure, a first input geometry 601 may include a 3D reconstructed mesh from a user's photographs, as disclosed above, and stored on e.g., memory 216 or any suitable data storage computing system deployed within the computing system 100 and accessible by the computing server system 114 (e.g., one of the plurality of computing systems 116a, 116b, 116c, . . . 116n). A second input model 602 may include a digitally sculpted face model of a character by an artist converted to triangular mesh and stored on e.g., memory 216 or any suitable data storage computing system deployed within the computing system 100 and accessible by the computing server system 114 (e.g., one of the plurality of computing systems 116a, 116b, 116c, . . . 116n).

Next, a facial deformation descriptor (FDD) may be defined locally on each patch of the triangular mesh as the weighted sum of two terms as shown in equation (1). A global weight $\beta$ is used to adjust the relative importance of the two terms in the FDD.

$$E = E_m + \beta E_b \quad (1)$$

The first term $E_m$ may measure the amount of stretching on the surface of the geometry, and it is computed by first identifying a rotation for each deformed triangle to align it as close as possible to its pre-deformation position and orientation, then computing the sum of the differences of the corresponding edges' lengths. As disclosed above, a 3D mesh may include triangles (or other geometric elements) connected to form a surface. When the 3D mesh undergoes deformation (e.g., bending, stretching, or compressing), the positions of vertices change, altering the triangle shapes and edge lengths. Stretching deformation may be used to measure how much the surface has deviated from its original, undeformed state in terms of edge lengths. To isolate pure stretching effects (not including rotations), each deformed triangle may be aligned to its original (pre-deformation) orientation using a rotation. This alignment may ensure that the differences being measured are due to stretching and not due to overall rotation. After alignment, the process may measure the difference in length between corresponding edges of the aligned triangle and its pre-deformation counterpart. Stretching may correspond to the difference in edge lengths before and after deformation. To calculate the total stretching for the entire surface, these edge-length differences (after alignment) may be summed up over all the triangles in the mesh. This results in a global measure of how much the mesh has stretched from its original configuration. The determination of the first term may effectively separate stretching (e.g., changes in size or scale) from other transformations like rotation, thereby ensuring an accurate measurement of deformation by first aligning triangles to their original orientations and then comparing the lengths of corresponding edges.

In accordance with one implementation, the first term may be calculated in accordance with equation (2):

$$E_m = \sum_{k \in F} \sum_{i, j \in F_k} w_{ij} \|e_{ij} - R_k e_{ij}^0\|^2 \qquad (2)$$

Here, F may represent a triangle on the surface of the geometry, $F_k$ are all the vertices on F, $e_{ij}$, $e_{ij}^0$ represents the edge between vertex i and j in the deformed and original mesh respectively, $R_k$ represents a rotation to align the deformed edge with the original edge, $w_{ij}$ is a per face normalization coefficient.

The second term $E_b$ may measure the amount of bending at a local patch on the surface. It may be computed by identifying an affine transformation to align the deformed triangle to its pre-deformation position, then applying the same affine transform to all of its 1-ring neighborhood triangles, and computing the sum of the differences in their corresponding edges' lengths.

In a 3D surface or mesh, bending deformation may generally refer to how much the shape has curved or deviated in terms of relative orientation between adjacent triangles or regions of the mesh, without focusing solely on stretching. A local patch or 1-ring neighborhood refers to the set of triangles that share a vertex or edge with a specific triangle. For a given triangle, this creates a local "patch" of connected triangles. An affine transformation (e.g., scaling, rotation, translation, and shearing) may be computed to map a deformed triangle as closely as possible to its pre-deformation position. The affine transformation may capture how the triangle as a unit has moved and deformed. In some embodiments, the same affine transformation that aligned the first triangle may be applied to its neighboring triangles in the 1-ring patch. This adjustment realigns neighboring triangles to the deformed triangle's corrected frame of reference. After aligning the neighboring triangles to match the deformed triangle's affine-transformed frame, in order to identify differences caused by relative bending of the triangles in the patch, the next step may compare the edge lengths of these neighboring triangles with their counterparts in the pre-deformation mesh. The differences in edge lengths between corresponding triangles (before and after deformation) may be summed across all triangles in the 1-ring neighborhood. This aggregate value may measure the bending deformation of the surface in that localized region.

In other words, the second term may measure how much the surface has curved (bent) locally. Specifically, the affine transformation captures global transformations and isolates relative changes between a triangle and its neighbors. Applying this transformation to the neighbors may ensure that the comparison isolates bending instead of other deformation types (e.g., stretching or rigid motion). The differences in edge lengths may quantify how much the relative positioning of triangles has changed, which directly relates to bending. The second term provides a localized, curvature-sensitive measure of deformation that complements the stretching term for a complete understanding of mesh behavior.

In accordance with one implementation, the second term may be calculated in accordance with equation (3), where F, $w_{ij}$, $e_{ij}$, $e_{ij}^0$ has the same meaning as in equation (2), $N_k$ represents the one-ring neighborhood of the k-th face, $T_k$ represents the affine transform to align the deformed edge with the original edge, and $c_k$ represents the number of edges in the neighborhood.

$$E_b = \sum_{k \in F} \sum_{i, j \in N_k} \frac{1}{c_k} w_{ij} \|e_{ij} - T_k e_{ij}^0\|^2 \qquad (3)$$

As shown in FIG. 6, the FDD computation module 606 may take the fused facial geometry 605 in addition to the two original input meshes 601, 602 as input. In one embodiment, the FDD computation module 606 may compute the fused mesh's deformation against the two original input meshes and outputs the FDD for the first face 607 and the FDD for the second face 608, respectively. This computation may be repeated in each iteration of the optimization process to reflect the updated vertex positions of the fused face mesh. In a first iteration, a fused mesh may be initialized with any reasonable mesh with the same topology. In practice, the FDD computation module 606 may initialize it to be identical to the first input mesh.

The FDD for the first and second meshes may be then combined 609 at each local patch on the surface as a weighted sum, sampling the weight $\alpha_k$ from the blending weight map 603, to produce the target FDD 610, as shown in equations (4) and (5). In these two equations, $\alpha_k$, $c_k$, $w_{ij}$, $e_{ij}$, $R_k$, $T_k$ have the same meaning as in equation (2) and (3), and the super script u and c are appended when appropriate to indicate whether the variables refer to the user or canon mesh respectively.

$$E_m = \sum_{k \in F} \sum_{i, j \in F_k} (1 - \alpha_k) w_{ij}^u \|e_{ij} - R_k^u e_{ij}^u\|^2 + \alpha_k w_{ij}^c \|e_{ij} - R_k^c e_{ij}^c\|^2 \qquad (4)$$

$$E_b = \sum_{k \in F} \sum_{i, j \in N_k} \frac{1 - \alpha_k}{c_k} w_{ij}^u \|e_{ij} - T_k^u e_{ij}^u\|^2 + \frac{\alpha_k}{c_k} w_{ij}^c \|e_{ij} - T_k^c e_{ij}^c\|^2 \qquad (5)$$

Thereafter, the vertex position solver module 611 may employ a quadratic energy minimization method with fixed variables to solve for the optimal vertex positions of output fused mesh, which is the configuration of vertices that minimizes the target FDD.

Because the edge vector $e_{ij}$ may be computed by $P_i-P_j$, where $P_i$ represents the 3D position of vertex i of the mesh. Equivalently, the vertex position solver module 611 may solve for P that minimizes $E=E_m+\beta E_b$.

Quadratic energy minimization may generally refer to a mathematical method where the "energy" (a scalar value representing a target function) is minimized. The energy function is quadratic, meaning it involves squared terms of variables (e.g., distances, lengths, or other measures of deformation). In one embodiment, the minimization may be carried out with either a direct linear least square solver or a Lagrange multiplier-based non-linear iterative solver. In another embodiment, the vertex position solver module 611 may use input anchor points 604 and their positions as fixed variables in the solver to provide constraints and boundary conditions. That is, in the optimization process, some variables (vertex positions) may be held fixed, serving as boundary conditions or anchors, thereby ensuring stability and preventing unintended shifts in the mesh.

As the last step in one iteration, the fused facial geometry 605 may be updated with the output vertex positions from the solver. Then the process continues to the next iteration as indicated in FIG. 6 by feeding the fused face mesh to FDD computation module again.

This process of FIG. 6 may repeat until a predetermined number of iterations have been completed, or a threshold of FDD value is reached, whichever comes first.

The intermediate outputs in the process, including the FDD, the fused mesh, may be stored either in e.g., memory 216 or any suitable computing system deployed within the computing system 100 and accessible by the computing server system 114 (e.g., one of the plurality of computing systems 116a, 116b, 116c, . . . 116n).

The final output of the process of FIG. 6 may include a fused face mesh (e.g., fused face model 312 of FIG. 3), which may be stored to e.g., memory 216 or any suitable computing system deployed within the computing system 100 and executing the optimization process (e.g., a Cloud server which is one of the plurality of computing systems 116a, 116b, 116c, . . . 116n).

Figure 7:
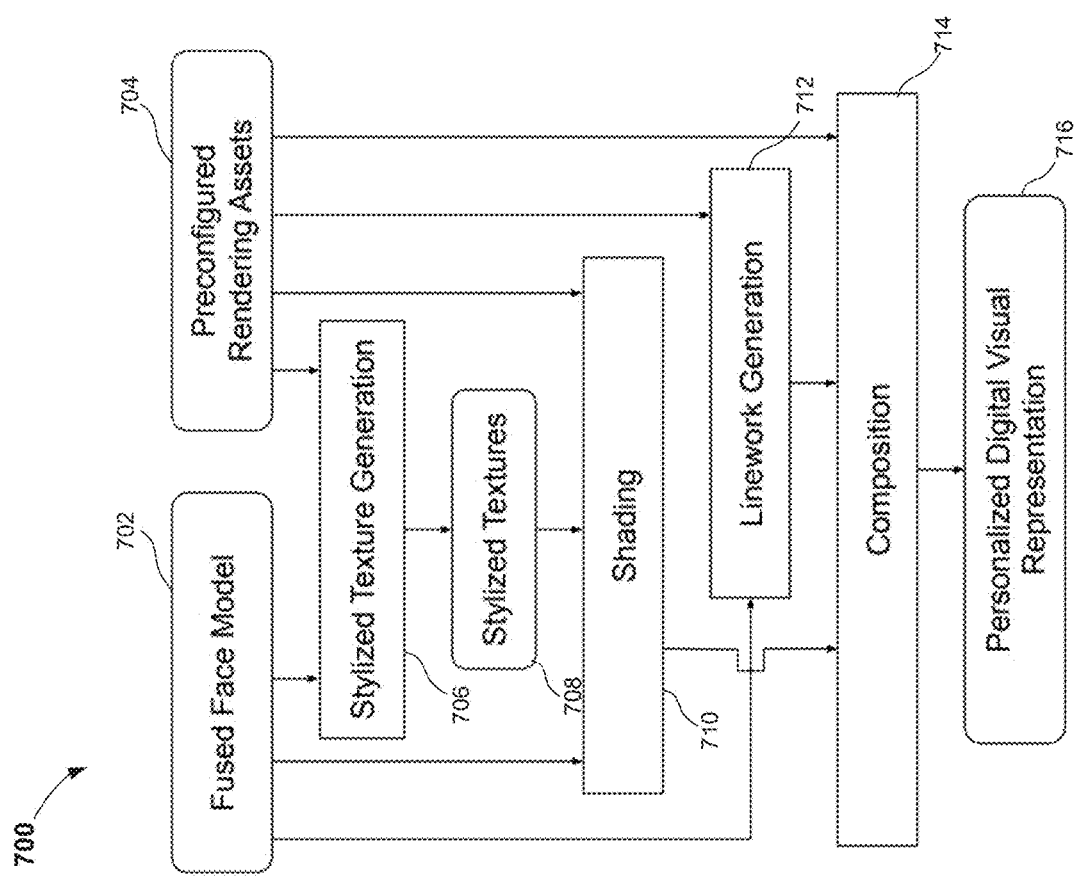
FIG. 7 illustrates a workflow of a rendering process, according to an exemplary aspect of the present disclosure.

Referring now to FIGS. 2 and 7, the rendering module 214, may be configured to generate one or more personalized digital visual representations 716 based at least upon the fused face model 702 generated via prior steps and preconfigured rendering assets 704 in a number of processes including but not limited to stylized texture generation 706, shading 710, linework generation 712, and composition 714.

The stylized texture generation step 706 may be performed by the stylized texture generation module 214a. This step may take as input the fused face model 702 and produce stylized textures 708 that preserve the user's personal characteristics present in fused face model 702, while conforming to a predefined art direction. As used herein, the term "stylized" refers to conforming to a predefined art direction, which may include photorealistic directions as well as non-photorealistic directions, such as cell shading. The term "stylized" is not intended to exclude photorealistic rendering style. In one embodiment, facial textures in the fused face model 702, such as the facial albedo color texture, may be output without change, suitable for a photorealistic rendering style. In another embodiment, the facial textures in the fused face model 702 may be blurred to create a simplified, stylized appearance, and example blur types may include Gaussian, box, median, and bilateral blurs. The blur strength may be spatially varying and controlled by a weight map stored as part of the preconfigured rendering assets 704. In yet another embodiment, a guided texture synthesis may be used. The synthesis process works by selecting and rearrange pixel patches from a style source texture (stored as part of the preconfigured rendering assets 704) to fill-up a target texture, determined by a few guidance channels defined for both the style source texture and the target texture. The guidance channels may include various facial textures (e.g., facial albedo color texture, facial segmentation texture) that may be part of the fused face model 702, shading intensity according to preconfigured lighting and material parameters, and other surface signals defined over the facial geometry specified by the fused face model 702. Moreover, the synthesis may be performed either in texture space, or first in image plane defined by preconfigured camera parameters and then unprojected into texture space. Additionally, hybrid approaches combining these methods may be used to transform the original texture into the desired style.

Thereafter, the shading step 710 may be performed by the shading module 214b to render a fused head geometry using a preconfigured shading style 704, optionally making use of the stylized textures 708 generated in the previous step 706. In one embodiment, toon-shading may be used, with preconfigured color lookup tables to independently stylize the diffuse and specular components from shading computation. These lookup tables may be stored as part of the preconfigured rendering assets 704, and can be used to achieve, for example, a cel-shaded look. The stylized textures 708 corresponding to the albedo color texture from the fused face model 702 may be used as the albedo color and blended with the output of toon-shading. In another embodiment, physically-based shading (PBR) may be used to create a more realistic effect. PBR models lighting based on physical principles, incorporating realistic material properties such as albedo, roughness, and metallicity. The stylized textures 708 corresponding to the albedo color texture from the fused face model 702 may be applied to the albedo component, while the shading model may use preconfigured parameters for roughness and metallicity to produce a visually consistent result within a predefined art direction. This can include applying a non-physical or exaggerated lighting model to give a more illustrative or stylized look while maintaining the benefits of physically-based lighting, such as accurate reflections and material interactions. The combination of PBR with stylized textures offers a hybrid approach that balances realism with artistic expression.

The linework generation step 712 performed by the linework generator 214c may render line drawings from the fused facial data to enhance the rendering. There are several embodiments for implementing linework generation 712. A first embodiment may employ an inverse hull method, which generates linework by rendering an inverted, expanded version of the fused face model with backface-culling turned on, followed by re-rendering the fused face model as described in the shading step 710. A second embodiment may explicitly generate various contour line segments, including silhouette contours, suggestive contours, ridges, valleys, and apparent ridges, by analyzing the geometric and topological features of the fused face mesh. An additional embodiment may use image-space contour generation, which detects and extracts edges and lines directly from rendered images of the 3D model using image-processing techniques, such as gradient analysis or depth-buffer comparisons. The line width, color, and transparency of the generated linework 712 may be controlled by preconfigured parameter field defined over the face mesh of the personalized digital visual representation to achieve the desired stylistic effect. These parameters may be stored as part of the preconfigured rendering assets 704, and further adjusted at runtime based on factors like the distance between the rendered 3D model and the camera, in order to enhance visual clarity and stylistic consistency.

Subsequently, the composition step 714 of FIG. 7 may be performed by the composition module 214b to integrate the outputs from the shading 710 and linework generation 712 and composite them on top of one or more background layers specified by the preconfigured assets 704. For example, the background layers may include static images or dynamically animated layers that incorporate effects like sprite animation, particle effects, vertex animation, and screen-space reflections. The composition step 714 may also render preconfigured 3D scenes and use the result as a background layer. This supports a 2.5D visual style that combines the depth and parallax effects of 3D environments with the illustrative qualities of rendering of personalized digital visual representations. The composition step 714 may use various image blending operators such as darken, screen, multiply, and overlay to merge its various image layers, allowing for flexible control over the final visual style of the rendering of the personalized digital visual representation 716.

The aforementioned stylized texture generation step 706, shading step 706, and linework generation step 706 all may utilize the facial geometry specified by the fused face model 702. Facial geometry corresponding to different facial expressions may be computed from the fused face model as previously described. Accordingly, the facial geometry used in these steps may represent different facial expressions which may be specified by the preconfigured rendering assets 704, or determined through other inputs, such as a combination of user input and the preconfigured rendering assets 704.

As described previously with respect to FIG. 3, the character fusion module 212 of the computing server system 114 may select and adjust, either by an end-user or an artist, for each local patch on an output face mesh, the degree of geometric similarity to two input meshes respectively representing the user's and the selected artist-designed character's facial geometries.

According to some implementations, an artist may use the vertex paint feature in a 3D modeling software package, such as Blender, to assign a number x between 0 and 1 to each vertex on the face mesh. According to other implementations, an artist may use any 2D or 3D painting software, such as Adobe Photoshop, Substance Painter to paint color on a texture map for the face mesh, and the system converts each color to a value x between 0 and 1 according to a colormap. In both kinds of implementations, x being closer to 0 indicates that the local patch around that vertex should be more similar to the user's face, and x being closer to 1 indicates that it should be more similar to the character's face. These values of x are stored alongside the character face model as a per-vertex or per-pixel blending weight map.

Figure 8:
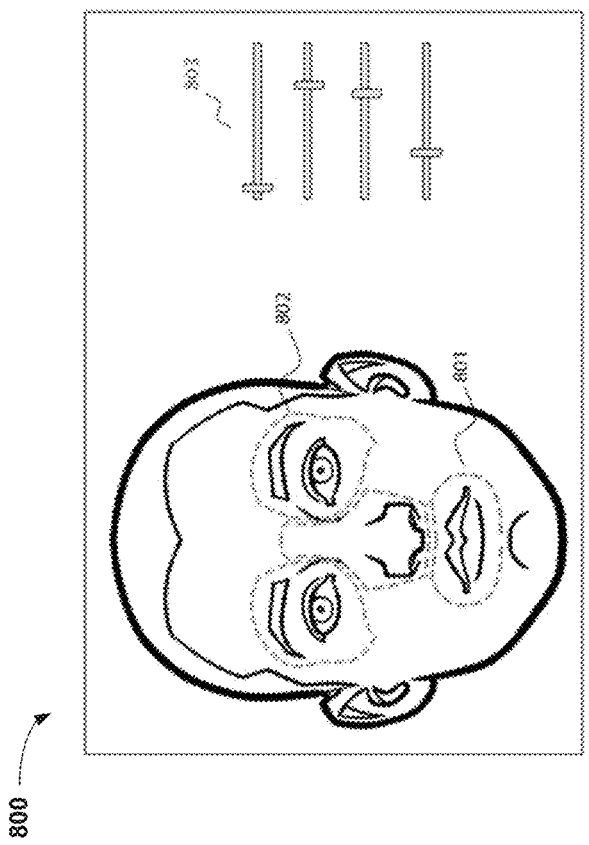
FIG. 8 illustrates a first example graphical user interface (GUI), according to an exemplary aspect of the present disclosure.

In accordance with various aspects of the present disclosure, FIG. 8 illustrates a first example graphical user interface (GUI) 800 associated with an application downloaded on an artist's computing device (e.g., at least one of the computing devices or systems 104, 106, or 108 of FIG. 1) for controlling fusion outcome. In the GUI 800, a face may be partitioned into multiple predefined regions corresponding to identifiable features, such as the mouth 801, left eye 802, etc. It may also be one region that corresponds to the entire face. The GUI 800 may be configured to generate and display various UI elements to allow user interaction with each of the predefined regions 801, 802 respectively. For example, an artist may use one of the sliders 803 to control a selected region to be more similar to the user's face by moving the slider closer to the left end, or the character's face by moving it closer to the right end. The slider locations may be assigned to all the vertices in the corresponding regions as values between 0 and 1 and stored as a per-vertex blending weight map 603 alongside each character.

Figure 9:
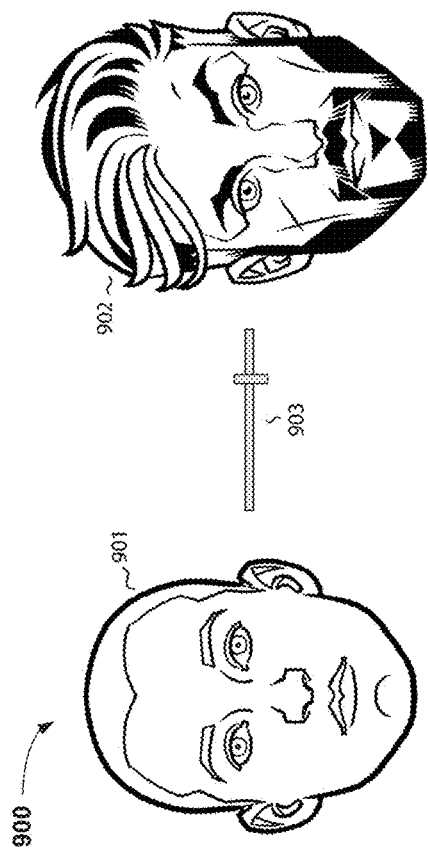
FIG. 9 illustrates a second example GUI, according to an exemplary aspect of the present disclosure.

In accordance with additional aspects of the present disclosure, FIG. 9 illustrates a second example GUI 900 associated with an application downloaded on a user's computing device (e.g., at least one of the computing devices or systems 104, 106, or 108 of FIG. 1) for adjusting and controlling parameters relating to a similarity between a fused face model and the user's face or a selected character's face.

In one embodiment, the GUI 900 as shown in FIG. 9 may be configured to display the user's face model 901, the selected character's face model as designed by an artist 902, and a UI element for controlling the similarity therebetween (e.g., a slider 903 or any other suitable UI element). For example, a received user input may move the slider 903 towards either the user's face model 901 or the selected character's face model 902 to dynamically align parameters of the resultant fused model with that of the user's or the selected character's. In some implementations, the GUI 900 may display in real-time the resultant fused model in accordance with continuous user inputs via the slider 903 which is especially user-friendly for touch interfaces like mobile devices. The slider 903 allows real-time, smooth adjustments, providing immediate feedback on changes. In an embodiment, the position the slider 903 may be converted to a fractional value between 0 and 1, and multiplied to the blending weight map 603 in the fusion FDD computation module 609 of FIG. 6.

Figure 10:
FIG. 10 illustrates a front view image of a user face.
Figure 11:
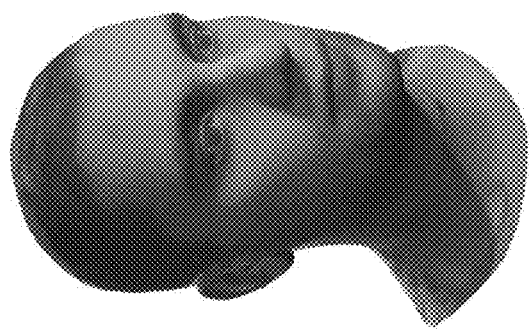
FIG. 11 illustrates an image of a user face taken from a left perspective.
Figure 12:
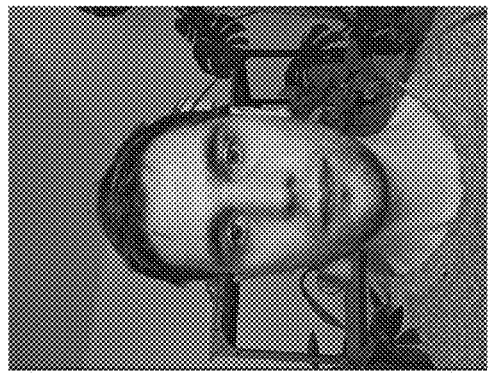
FIG. 12 illustrates an image of a user face taken from a right perspective.
Figure 13:
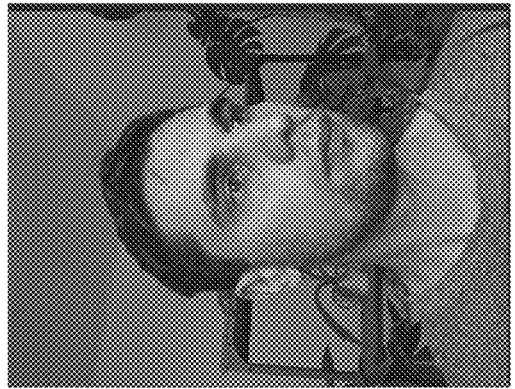
FIG. 13 shows an example user face model generated by a face reconstruction module, according to an exemplary aspect of the present disclosure.

FIGS. 10, 11, and 12 illustrate examples user selfie photos (e.g., user photos or videos 302 of FIG. 3) used as input to the aforementioned face reconstruction process 304. Specifically, FIG. 10 illustrates a front view image of a user face, FIG. 11 illustrates an image of the same user face taken from a left perspective, and FIG. 12 shows an image of the same user face taken from a right perspective. FIG. 13 shows an example user face model (e.g., user face model 306 of FIG. 3) generated by the face reconstruction module 210, in accordance with aspects of the present disclosure.

Figure 15:
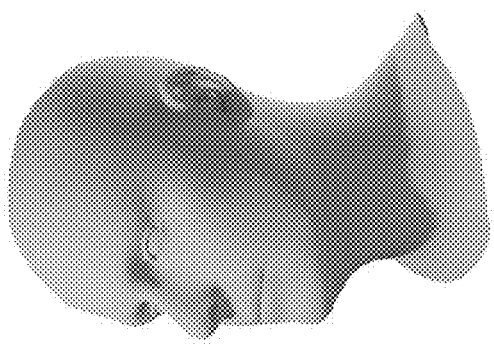
FIG. 15 illustrates an example facial geometry (neutral expression) obtained from a user face module, according to an exemplary aspect of the present disclosure.
Figure 17:
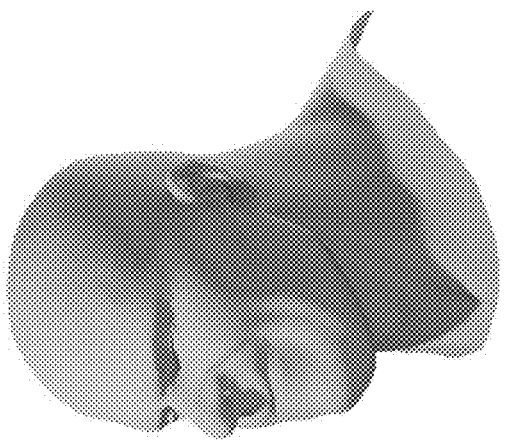
FIG. 17 illustrates an example fused facial geometry (in template expressions) produced by a character fusion module, according to an exemplary aspect of the present disclosure.
Figure 14:
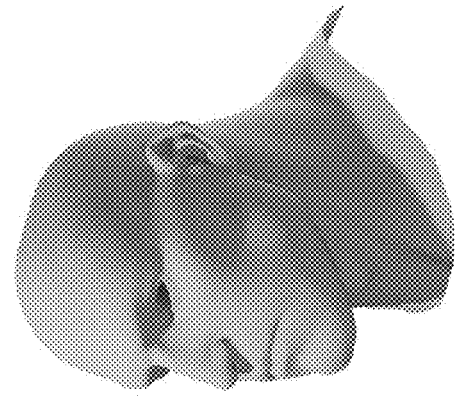
FIG. 14 illustrates an example facial geometry specified by a character face model, according to an exemplary aspect of the present disclosure.
Figure 16:
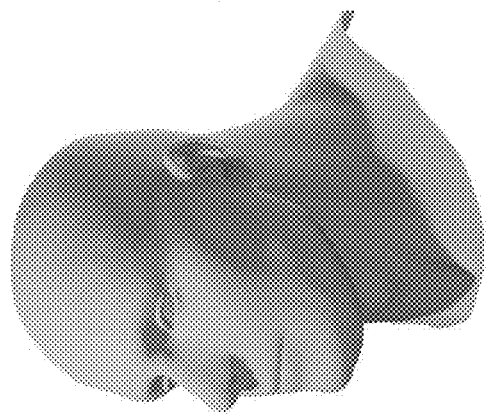
FIG. 16 illustrates an example fused facial geometry (neutral expression) produced by a character fusion module, according to an exemplary aspect of the present disclosure.

Referring now to FIG. 14, an example facial geometry specified by the character facial geometry 502 of FIG. 5 is illustrated. FIG. 15 illustrates an example facial geometry (neutral expression 513) obtained from the user face model 306. FIG. 16 illustrates an example fused facial geometry (neutral expression 518) produced by the character fusion module 212. Notably, the fused face model incorporates the geometric characteristics of the eyes, nose, and lips from the user face model (FIG. 15), while adopting the geometric characteristics of the cheeks, jawline, and neck from the character facial geometry (FIG. 14). This demonstrates that both the regions of the fused face geometry that resembles the user or the character, as well as the degree of resemblance in each region, may be controlled using the blending weight map 603. FIG. 17 illustrates an example fused facial geometry (in template expressions 517), specifically corresponding to a smirk expression, as produced by the character fusion module 212.

Figure 18:
FIG. 18 illustrates a first example personalized digital visual representation generated by a rendering module, according to an exemplary aspect of the present disclosure.
Figure 19:
FIG. 19 illustrates a second example personalized digital visual representation generated by a rendering module, according to an exemplary aspect of the present disclosure.

FIGS. 18 and 19 respectively illustrate example personalized digital visual representations generated by the rendering module 214 based on different preconfigured rendering assets 314. FIG. 18 corresponds to a more cartoony art direction, while FIG. 19 showcases a more photorealistic art direction, but with stylized visual elements such as cross-hatched shadowed regions. These examples highlight the ability to finely control various aspects of rendering, including the rendering style, background, lighting conditions, and viewing angles. It should be noted that FIGS. 13, 15, 16, 17, 18, and 19 all illustrate results generated based on the user selfie photos shown in FIGS. 10, 11, and 12. Therefore, the rendered faces in FIGS. 18 and 19 remain recognizable as the user depicted in the selfie photos shown in FIGS. 10, 11, and 12.

Those skilled in the art will appreciate that the various embodiments of the present disclosure may be carried out in other specific ways than those set forth herein without departing from the scope and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The invention claimed is:

1. A system deployed within a communication network for generating one or more personalized digital visual representations, the system comprising:

a first computing device, comprising:
- a first non-transitory computer-readable storage medium configured to store an application program; and
- a first processor coupled to the first non-transitory computer-readable storage medium and configured to execute instructions of the application program to obtain one or more photos or videos of a user; and a second computing device, comprising:
- a second non-transitory computer-readable storage medium; and
- a second processor coupled to the second non-transitory computer-readable storage medium and configured to:
  - receive, via a first application programming interface (API) call, the one or more photos or videos of the user,
  - process the one or more photos or videos to determine at least facial geometry characteristics of a user face model, wherein the facial geometry characteristics of the user face model comprise a first plurality of three-dimensional (3D) meshes,
  - obtain at least facial geometry characteristics of a selected canon character from a character face model, wherein the facial geometry characteristics of the character face model comprise a second plurality of 3D meshes,
  - generate a third plurality of 3D meshes of a fused face model to retain geometric features of both the first plurality of 3D meshes of the user face model and the second plurality of 3D meshes of the character face model and use at least one parameter to control a degree of geometric similarity for one or more local patches on the third plurality of 3D meshes to the first and second plurality of 3D meshes,
  - generate one or more personalized digital visual representations based at least upon the fused face model,
  - save parameters relating to the fused face model on the second non-transitory computer-readable storage medium, and
  - transmit, via a second API call, the one or more personalized digital visual representations to the first computing device, wherein the first processor of the first computing device is further configured to execute the instructions of the application program to receive and display the one or more personalized digital visual representations on a display interface of the first computing device.

2. The system of claim 1, wherein each of the first, second and third plurality of 3D meshes comprises at least data defining a connectivity between vertices, edges and faces in each 3D mesh.

3. The system of claim 1, wherein the facial geometry characteristics of the user face model comprise parameters relating to a plurality of facial expressions.

4. The system of claim 1, wherein the second processor is further configured to process the one or more photos or videos to determine parameters relating to facial textures.

5. The system of claim 1, wherein the second processor is further configured to determine the geometric similarity based at least on local geometric descriptors including a facial deformation descriptor.

6. The system of claim 5, wherein the second processor is further configured to use a blending weight map to control the geometric similarity.

7. The system of claim 5, wherein the facial deformation descriptor measures local stretching and bending of each patch on a surface of each 3D mesh.

8. The system of claim 5, wherein the second processor is further configured to determine a plurality of vertex positions of the fused face model by minimizing a sum of a blended target facial deformation descriptor over each 3D mesh of the fused face model.

9. The system of claim 1, wherein the second processor is further configured to generate parameters representing at least one of a stylized texture, a shading, and linework in accordance with at least one of a plurality of preconfigured rendering assets, and integrate the at least one of the stylized texture, the shading, and the linework with one or more background layers selected from the plurality of preconfigured rendering assets to render the one or more personalized digital visual representations.

10. The system of claim 1, wherein the second processor is configured to process the one or more photos or videos to determine at least the facial geometry characteristics of the user face model by at least:
- converting the one or more photos or videos into a plurality of face images;
- identifying a plurality of facial landmark points for each of the plurality of face images; and
- segmenting each of the plurality of face images into distinct semantic regions.

11. The system of claim 10, wherein the plurality of facial landmark points include corners of eyes, a base of a nose, boundary points of lips, and a jawline contour.

12. The system of claim 10, wherein the second processor is configured to segment each of the plurality of face images by assigning a label for each pixel in each face image in accordance with the distinct semantic regions.

13. The system of claim 10, wherein the second processor is configured to segment each of the plurality of face images by determining a probability for each pixel in each face image belonging to one of the distinct semantic regions.

14. The system of claim 10, wherein the second processor is further configured to determine 3D information relating to the facial geometry characteristics of the user face model based on the plurality of facial landmark points.

15. The system of claim 14, wherein the second processor is further configured to determine a plurality of camera parameters for each of the plurality of face images, wherein the plurality of camera parameters relate to camera rotation, camera translation, and a field of view angle.

16. The system of claim 15, wherein the second processor is further configured to optimize a discrepancy between the plurality of facial landmark points and the 3D information projected to a 2D image plane of a corresponding camera.

17. The system of claim 16, wherein the 3D information are represented by a Morphable Face Model (MFM) and a plurality of associated coefficients including at least a first set of coefficients encoding subject-specific facial structure and a second set of coefficients encoding at least expression-specific facial structure.

18. The system of claim 17, wherein the second processor is further configured to estimate the 3D information by optimizing a difference between the plurality of face images and renderings of the 3D information.

19. The system of claim 18, wherein the second processor is further configured to refine the 3D information by computing a per-vertex scalar displacement field to adjust mesh vertex positions along per-vertex normals, wherein each of a plurality of 3D meshes of the user face model is generated based on the MFM and the plurality of associated coefficients.

20. The system of claim 18, where the second processor is further configured to estimate facial albedo color.

21. The system of claim 18, where the second processor is further configured to estimate lighting parameters.

22. The system of claim 15, wherein the second processor is further configured to generate facial segmentation maps from the plurality of face images, wherein the facial segmentation maps are unprojected from image space to texture space and combined into a unified facial segmentation texture.

23. A computer-implemented method for generating one or more personalized digital visual representations, comprising:
    obtaining, by a first processor of a first computing device deployed within a communication network, one or more photos or videos of a user;
    receiving via a first application programming interface (API) call, by a second processor of a second computing device deployed within the communication network, the one or more photos or videos of the user from the first computing device;
    processing, by the second processor of the second computing device, the one or more photos or videos to determine at least facial geometry characteristics of a user face model, wherein the facial geometry characteristics of the user face model comprise a first plurality of three-dimensional (3D) meshes;
    obtaining, by the second processor of the second computing device, at least facial geometry characteristics of a selected canon character from a character face model, wherein the facial geometry characteristics of the character face model comprise a second plurality of 3D meshes;
    generating, by the second processor of the second computing device, a third plurality of 3D meshes of a fused face model to retain geometric features of both the first plurality of 3D meshes of the user face model and the second plurality of 3D meshes of the character face model and using at least one parameter to control a degree of geometric similarity for one or more local patches on the third plurality of 3D meshes to the first and second plurality of 3D meshes;
    generating, by the second processor of the second computing device, one or more personalized digital visual representations based at least upon the fused face model;
    saving, by the second processor of the second computing device, parameters relating to the fused face model;
    transmitting, by the second processor of the second computing device via a second API call, the one or more personalized digital visual representations to the first computing device; and
    receiving and displaying, by the first processor of the first computing device, the one or more personalized digital visual representations on a display interface of the first computing device.

24. The computer-implemented method of claim 23, further comprising determining, by the second processor, the geometric similarity based at least on local geometric descriptors including a facial deformation descriptor.

25. The computer-implemented method of claim 24, further comprising using, by the second processor, a blending weight map to control the geometric similarity.

26. The computer-implemented method of claim 24, wherein the facial deformation descriptor measures local stretching and bending of each patch on a surface of each 3D mesh.

27. The computer-implemented method of claim 23, wherein the processing, by the second processor of the second computing device, the one or more photos or videos to determine at least the facial geometry characteristics of the user face model comprises at least:
    converting the one or more photos or videos into a plurality of face images;
    identifying a plurality of facial landmark points for each of the plurality of face images; and
    segmenting each of the plurality of face images into distinct semantic regions.

28. A non-transitory computer readable medium storing machine executable instructions for a computing system deployed within a communication network for generating one or more personalized digital visual representations, the machine executable instructions being configured for:
    obtaining, by a first processor of a first computing device deployed within the communication network, one or more photos or videos of a user;
    receiving via a first application programming interface (API) call, by a second processor of a second computing device deployed within the communication network, the one or more photos or videos of the user from the first computing device;
    processing, by the second processor of the second computing device, the one or more photos or videos to determine at least facial geometry characteristics of a user face model, wherein the facial geometry characteristics of the user face model comprise a first plurality of three-dimensional (3D) meshes;
    obtaining, by the second processor of the second computing device, at least facial geometry characteristics of a selected canon character from a character face model, wherein the facial geometry characteristics of the character face model comprise a second plurality of 3D meshes;
    generating, by the second processor of the second computing device, a third plurality of 3D meshes of a fused face model to retain geometric features of both the first plurality of 3D meshes of the user face model and the second plurality of 3D meshes of the character face model and using at least one parameter to control a degree of geometric similarity for one or more local patches on the third plurality of 3D meshes to the first and second plurality of 3D meshes;
    generating, by the second processor of the second computing device, one or more personalized digital visual representations based at least upon the fused face model;
    saving, by the second processor of the second computing device, parameters relating to the fused face model;
    transmitting, by the second processor of the second computing device via a second API call, the one or more personalized digital visual representations to the first computing device; and
    receiving and displaying, by the first processor of the first computing device, the one or more personalized digital visual representations on a display interface of the first computing device.

* * * * *